(12) United States Patent
Sagal et al.

(10) Patent No.: US 11,294,664 B2
(45) Date of Patent: *Apr. 5, 2022

(54) VERSION CONTROL SYSTEM

(71) Applicant: CrossVista Inc., Hingham, MA (US)

(72) Inventors: Anatole Sagal, Northbrook, IL (US); Dan Schirf, Hanover, MA (US); Oleg Samchik, Saint Petersburg (RU); Konstantin Golomozyy, Saint Petersburg (RU); Sergey Gribovsky, Saint Petersburg (RU)

(73) Assignee: CrossVista, Inc., Hingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,969

(22) Filed: Jun. 5, 2020

(65) Prior Publication Data

US 2021/0382709 A1 Dec. 9, 2021

(51) Int. Cl.
*G06F 8/71* (2018.01)
(52) U.S. Cl.
CPC ....................................... *G06F 8/71* (2013.01)
(58) Field of Classification Search
CPC ........................................................ G06F 8/71
See application file for complete search history.

(56) References Cited

U.S. PATENT DOCUMENTS

| | | | |
|---|---|---|---|
| 4,558,413 A | 12/1985 | Schmidt et al. | |
| 4,912,637 A | 3/1990 | Sheedy et al. | |
| 5,649,200 A | 7/1997 | Leblang et al. | |
| 5,675,802 A | 10/1997 | Allen et al. | |
| 5,845,128 A | 12/1998 | Noble et al. | |
| 5,897,642 A * | 4/1999 | Capossela | G06F 16/252 |
| 5,903,897 A | 5/1999 | Carrier, III et al. | |
| 6,073,214 A | 6/2000 | Fawcett | |
| 6,094,679 A | 7/2000 | Teng et al. | |
| 6,223,343 B1 | 4/2001 | Hopwood et al. | |
| 6,385,768 B1 | 5/2002 | Ziebell | |

(Continued)

FOREIGN PATENT DOCUMENTS

EP 2 977 888 A1 1/2016

OTHER PUBLICATIONS

Chacon et al., "Pro Git", (May 26, 2020).pp. 1-527.

(Continued)

*Primary Examiner* — Douglas M Slachta
(74) *Attorney, Agent, or Firm* — Woodard Emhardt Henry Reeves & Wagner LLP

(57) ABSTRACT

A version control system implemented in software and executed by one or more processors that provides for change set integration for diverse types of objects. The system may be configured to handle a wide range of objects of different types committed to the version system by storing and/or versioning the objects, change sets, and complex relationships between objects and object dependencies. Unified support for development operations may be provided as assets under version control may optionally be deployed, rolled back, compared to a corresponding live environment, and tested thus providing for sophisticated development and operational cycles. The system provides automatic and/or semi-automatic object integration such as may be useful for continuous development and integration and feature based development.

20 Claims, 21 Drawing Sheets

(56) References Cited

U.S. PATENT DOCUMENTS

| | | | |
|---|---|---|---|
| 7,134,122 B1 | 11/2006 | Sero et al. | |
| 7,146,608 B1 | 12/2006 | Newman et al. | |
| 7,149,699 B2 | 12/2006 | Barnard et al. | |
| 7,296,037 B1* | 11/2007 | Kruy | G06F 16/2443 |
| 7,496,645 B2 | 2/2009 | Yeung et al. | |
| 7,680,932 B2 | 3/2010 | Defaix et al. | |
| 8,245,192 B1* | 8/2012 | Chen | G06F 8/71 717/122 |
| 8,677,315 B1 | 3/2014 | Anderson et al. | |
| 8,751,464 B1* | 6/2014 | Weiss | G06Q 10/10 707/695 |
| 8,826,222 B2* | 9/2014 | Bak | G06Q 10/06 717/101 |
| 9,208,056 B1* | 12/2015 | Henriksen | G06F 11/3604 |
| 9,286,187 B2 | 3/2016 | Brucker et al. | |
| 9,430,229 B1* | 8/2016 | Van Zijst | G06F 9/3844 |
| 9,471,304 B1* | 10/2016 | Fuchs | G06F 8/71 |
| 9,606,903 B2 | 3/2017 | Murugesan | |
| 10,114,637 B1 | 10/2018 | Willson et al. | |
| 10,204,112 B1* | 2/2019 | Bhargava | G06F 16/93 |
| 10,387,153 B2* | 8/2019 | Cimadamore | G06F 9/3861 |
| 10,430,184 B2* | 10/2019 | Neatherway | G06F 8/71 |
| 11,144,313 B2* | 10/2021 | Nakaike | G06F 8/73 |
| 2004/0060044 A1 | 3/2004 | Das et al. | |
| 2004/0261053 A1 | 12/2004 | Dougherty et al. | |
| 2006/0271341 A1 | 11/2006 | Brown et al. | |
| 2007/0283321 A1* | 12/2007 | Hegde | G06F 8/71 717/110 |
| 2009/0019420 A1 | 1/2009 | Johnson | |
| 2009/0019426 A1* | 1/2009 | Baeumer | G06F 8/71 717/122 |
| 2009/0210857 A1* | 8/2009 | Martineau | G06F 8/35 717/120 |
| 2009/0300580 A1 | 12/2009 | Heyhoe et al. | |
| 2009/0327358 A1* | 12/2009 | Lukiyanov | G06F 16/48 |
| 2010/0131939 A1 | 5/2010 | Hieb et al. | |
| 2010/0257151 A1 | 10/2010 | Lohman et al. | |
| 2010/0299327 A1 | 11/2010 | Kiefer et al. | |
| 2010/0299663 A1 | 11/2010 | Weissman et al. | |
| 2010/0318969 A1 | 12/2010 | Petrovicky et al. | |
| 2011/0125798 A1* | 5/2011 | Misch | G06F 8/71 717/110 |
| 2013/0055233 A1* | 2/2013 | Hatton | G06F 8/71 717/170 |
| 2015/0100940 A1 | 4/2015 | Mockus et al. | |
| 2015/0106790 A1* | 4/2015 | Bigwood | G06F 11/3624 717/127 |
| 2015/0220331 A1* | 8/2015 | Bernstein | G06F 8/71 717/121 |
| 2015/0220332 A1* | 8/2015 | Bernstein | G06F 8/71 717/121 |
| 2015/0293834 A1 | 10/2015 | Potdar | |
| 2016/0092525 A1* | 3/2016 | Kothari | G06F 16/134 707/602 |
| 2016/0239295 A1* | 8/2016 | Kolesnik | G06F 8/30 |
| 2016/0292066 A1 | 10/2016 | Stevens et al. | |
| 2016/0378434 A1 | 12/2016 | Martick | |
| 2017/0093910 A1 | 3/2017 | Gukal et al. | |
| 2017/0124617 A1 | 5/2017 | Spoelstra et al. | |
| 2017/0169370 A1* | 6/2017 | Cornilescu | G06F 8/71 |
| 2017/0249644 A1 | 8/2017 | DiMaggio et al. | |
| 2017/0372247 A1 | 12/2017 | Tauber et al. | |
| 2018/0025011 A1 | 1/2018 | Aksionkin et al. | |
| 2018/0275986 A1 | 9/2018 | Ghosh et al. | |
| 2020/0192638 A1* | 6/2020 | Pezaris | G06F 8/73 |
| 2020/0364042 A1* | 11/2020 | Wuensche | G06F 8/77 |
| 2021/0255854 A1* | 8/2021 | Coscarelli | G06F 8/71 |

OTHER PUBLICATIONS

English translation of EP 2 977 888 A1 obtained from European Patent Office.

Mens, "A State-Of-The-Art Survey On Software merging"., IEEE Transactions On Software Engineering, IEEE Service Center, Los Alamitos, CA.,vol. 28, No. 5, (May 1, 2002), pp. 449-462.

Search Report and Written Opinion in PCT/US2021/020820.

* cited by examiner

VERSION CONTROL SYSTEM

BACKGROUND

This disclosure relates to a version control system for managing changes to files or other aspects of a shared project that may be contributed to by multiple users or systems at the same time. Many version control systems exist today which do not account for relationships between different objects or for the structural or functional dependencies between objects. As a result, these systems provide less effective version control with redundant merging of changes, and longer development and test cycles.

SUMMARY

Disclosed is a version control system that includes sophisticated dependency tracking and real-time notification of direct and indirect conflicts across multiple related branches. The disclosed system may be implemented in software and executed by one or more processors of one or more computers that provides for change set integration for diverse types of objects within an overall context, and change set integration for changes to the context as well. In another aspect, the disclosed system may be configured to unify various objects of different types committed to the version system by storing and/or versioning the objects, change sets, and complex relationships between objects and dependencies defined by the overall context.

In another aspect, the disclosed version control system may provide for unified support for development operations. Assets may optionally be deployed, rolled back, compared to a corresponding live environment, and tested thus optionally providing for sophisticated development and operational cycles. In another aspect, the disclosed system provides for automatic and/or semi-automatic object integration such as continuous development and integration, feature based development, and the like.

Disclosed is a version control system (herein referred to as "the VCS" or "the system") that optionally includes or provides for version information associated with one or more objects, the version information including data about changes made to the one or more objects. In another aspect, the system may include one or more branches with one or more objects are associated with at least one branch of the one or more branches. The version information for the one or more objects may include information about the branch the object is associated with. The system may be optionally configured to automatically detect a conflict for a first copy of an object associated with a first branch that is the result of changes made to a separate second copy of the object that is associated with a second branch that may be different from the first branch. The system may optionally be configured to update the version information for the first copy to indicate the nature of the conflict.

In another aspect, the version control system may be configured to automatically update the version information for the first copy of the object to indicate a conflict when a commit operation is performed on the second branch.

In another aspect, the system may include or define one or more live environments associated with the one or more separate branches. In another aspect, modifications to the one or more objects may be made in the live environment. In another aspect, the version information associated with one or more modified objects may be automatically updated when changes are made in the live environment.

In another aspect, the VCS optionally provides for or defines a live environment that may include a running software process that automatically modifies objects in at least one of the multiple live environments as a result of software executed by the running software process. The version control system may also automatically update the version information for the objects, which are changed in the live environment, or it may update the version information based on input from a user specifying the updated versions of the objects created or modified by the running process that should be committed to the VCS.

In another aspect, the VCS optionally includes a live environment that includes a native file system. In another aspect, changes to the multiple objects in the live environment may include adding, modifying, or deleting files from the respective branch associated with the live environment. The version control system may automatically update the version information for objects, which are changed in the live environment. Other examples of objects that may or may not be "files" include database tables, columns in the database table, rows or records in a table database, scripts, triggers, materialized views, sequences, indexes, maps, sets, schemas, table spaces, and the like. In another example, an object may include an Informatica map, source, target, or a webM service, transformation, as well as generic queues, services, service consumers and producers, and a like.

In another aspect, the system may be configured to integrate modifications made in one or more modified branches into a new revision of a third branch of the one or more branches. In another aspect, the one or more modified branches may be child branches of the third branch.

In another aspect, the version control system may include object dependencies specific to objects of the one or more branches. The object dependencies may define relationships between objects in the branch, and these relationships may optionally include specific information about at least one aspect of a first object that may be dependent on at least one aspect of a second object.

In another aspect, branches of the disclosed version control system may optionally include a collection of changes made to objects in the branch. This collection of changed object may be maintained in any suitable way, such as a set of changes specifying the object that changed, and the change that was made. Optionally, the changes may be organized in a branch as a graph of change objects specifying the object that changed, that change made to the object, and some aspect of the relationship between the changed object and other objects in the branch.

In another aspect, the disclosed version control system may include an object model specifying object types for objects stored in the branches, the object model optionally including one or more relationships between object types. In another aspect, the collection of changes that may be present in a branch may include be organized according to the object model.

In another aspect, the disclosed version control system may include an object model optionally specifying object types for the objects of the one or more branches in the VCS, and optionally, one or more relationships between object types. In another aspect, the object model may include a hierarchy of object types. For example, the object model may include a package object type that may refer to an abstract data type object type, the abstract data type object type may refer to a method object type, and the method object type may refer to a parameter object type. In this example, the hierarchy may specify the parameter type as being included in the method type, and optionally the method type as being included in the abstract data type, and optionally the abstract data type as included in the package. In another aspect, the disclosed version control system may include the objects belonging to the object model. These objects can be organized as an acyclical directed graph according to the type hierarchy.

In another aspect, the object dependencies may be determined by the version control system as a graph having vertices corresponding to multiple individual types of objects, and edges defining dependency relationships between the objects. These object dependencies may be determined dynamically whenever dependencies are checked, or maintained statically for reference and updated only as dependencies change, or in any other suitable manner.

In another aspect, the version control system may include multiple objects, and each object may include an identifier that uniquely identifies each object, and optionally a state value that includes information about a current state of each object.

In another aspect, the system may be configured to compare the state values of revised objects of the one or more objects that are associated with a first branch with state values of objects having the same identifier as the revised object but that are associated with a second branch. In another aspect, the system may register a direct conflict when the state values for two copies of the same object in different branches that do not match. In another aspect, the first object may be associated with a first branch, and the second object may be associated with a second branch, and the first and second branches are different branches. In another aspect, the first branch and the second branch may share a common parent branch that is separate from the first and second branches.

In another aspect, the version control system may be configured to automatically detect an indirect conflict for the first copy of the object in the first branch caused by modifications made to a third object in the second branch, wherein the object in the first branch depends on the third object. In another aspect, the VCS may optionally automatically update the version information for the first copy of the object to indicate the indirect conflict when a commit operation is performed on the second branch.

In another aspect, the first object may include a first object function specified as computer source code, the third object may include a separate third object function that is called by the first object function, and the separate third object function is required in order for the first object function to execute properly.

In another aspect, the first object may include a file containing text about a topic, the third object may be a collection of files with additional information about the topic that may be referred to by the text in the first object.

In another aspect, the first object may include a first database table with one or more records, the third object optionally includes a second database table with one or more records, and the records in the second database table may be required to maintain referential integrity for the records in the first database table.

In another aspect, the third object may include a first database table with one or more attributes, and optionally a function specified in computer source code that is configured to modify records in the first database table using the one or more attributes.

In another aspect, the one or more branches of the disclosed system may include at least one object type defining the type of objects that can be stored in the individual branches, a live environment to which objects of the individual branches may be deployed to or imported from, and at least one integration rule optionally defining a process by which child objects are merged into a parent branch that may be associated with the individual branches.

In another aspect, a first branch may include an initial snapshot of the individual objects associated with the branch, the initial snapshot may have version information for the individual objects with data about changes made to those objects in the past. In another aspect, the version information for the individual objects may be held in a child branch that may have the first branch as its parent branch, and may include one or more revisions of the individual objects made in the past in the parent branch. In another aspect, the initial snapshot of the child branch may include the one or more revisions from the parent branch.

In another aspect, the VCS may be configured to automatically collapse modifications to objects from one or more child branches into a new revision of a parent branch. In another aspect, the system may include integration rules defining objects from a child branch that may be collapsed into the parent branch. In another aspect, the integration rules may include a first rule configured to determine how modified files of a child branch are mapped to a parent branch, and optionally a second rule configured to determine how the system will integrate modified files of the child branch that are transformed to one of the parent branch's object types. In another aspect, the integration rules may include a first rule configured to determine how the records of a first database that have changed in the child branch are mapped or formatted to the parent branch, and optionally a second rule configured to determine how the schema changes in a second database relate to a parent branch. In another aspect, the integration rules may be configured to transfer the records from the first database to optionally replace the corresponding records in the second database. In another aspect, the version control system may be configured to accept input resolving conflicts between objects in the one or more child branches. In another aspect, the VCS may include a user interface configured to present information about conflicts between objects in the different branches.

In another aspect, the version control system may be configured to determine modified files of a child branch that are unmodified in a parent branch. In another aspect, the system is optionally configured to determine modified files of the parent branch that are unmodified in the child branch. In another aspect, the version control system may be configured to determine records of a first copy of a database that have changed in the child branch. In another aspect, the system may determine records in a second copy of the database that have changed in a parent branch.

Disclosed herein is a method of performing version control implemented in software running on one or more processors of one or more computers. The method may include automatically determining a conflict for objects of a first branch of a version control system, wherein the conflict may be the result of changes made to objects of a second branch of the version control system, and wherein the first and second branches of the version control system may be different branches with separate copies of the same objects. In another aspect, the method optionally includes updating version information for the objects in the first branch to indicate the nature of the conflict with objects in the second branch, wherein the version information optionally includes a reference to the respective branch the object is associated with, and wherein the version information optionally includes data about the changes made to the changed objects in the second branch.

In another aspect, the method optionally includes automatically updating the version information for objects in the first branch to indicate a conflict in response to a commit operation performed on the second branch.

In another aspect, the method optionally includes assembling a first change set representing changes made to objects of the first branch, optionally assembling a second change set representing changes made to objects of the second branch, and optionally determining that the conflict is a direct conflict when there is a first change to an object in the first change set, and a second different change to the same object in the second change set.

In another aspect, the objects of the first branch may include file objects that are associated with individual files, and the changes made to the file objects of the first branch represent changes to the individual files indicating that the file has been added, modified, or deleted. In another aspect, the objects of the second branch include file objects that are associated with separate copies of the same individual files represented by objects of the first branch, and the changes to the separate copies of the files in the second branch optionally indicate that the file has been added, modified, or deleted. In another aspect, assembling the first change set optionally includes determining a current state of each file in the first branch. In another aspect, assembling the second change set may include determining a current state of each file in the second branch, and optionally determining that a direct conflict is present may include comparing the state of files in the first branch with the state of corresponding files in the second branch.

In another aspect, the objects of the first branch may include table objects that are associated with database tables, and the changes made to objects of the first branch may include information about records and/or attributes of the database tables that have been added, modified, or deleted from the database tables. The objects of the second branch may include table objects that may be associated with separate copies of the same database tables represented by objects of the first branch, and the changes made to table objects of the second branch may include information about records and/or attributes of the database tables that may have been added, modified, or deleted. In another aspect, assembling the first change set optionally includes determining a current state of each database table in the first branch, assembling the second change set optionally includes determining a current state of each database table in the second branch, and optionally determining that a direct conflict may be present by comparing the state of database tables in the first branch with the state of corresponding database tables in the second branch.

In another aspect, the method optionally includes assembling first change set dependencies for objects in the first change set, the first change set dependencies may optionally represent objects in the first branch that the objects in the first change set depend on. In another aspect, the method may also involve assembling second change set dependencies for objects in the second change set, the second change set dependencies representing objects in the second branch that the objects in the second change set depend on. Additionally, the method may optionally include determining that an indirect conflict exists for those objects having at least one dependency in both the first and second change set dependencies.

In another aspect, the first change set dependencies optionally include shared libraries, the second branch optionally includes changes to the shared the libraries the objects of the first change set depend on, and the changes to the shared libraries may include information about shared libraries that have been added to, modified in, or deleted from the libraries of the second branch.

In another aspect, the method may include determining that an indirect conflict is present by comparing version information associated with the shared libraries of the first branch with the corresponding version information associated with the shared libraries of the second branch.

In another aspect, the disclosed method optionally includes automatically modifying objects in the second branch using a software process executing on the one or more processors of the one or more computers, wherein the software process is executing in a live environment associated with the second branch.

In another aspect, the method optionally includes periodically identifying changes made to files in a native file system of the live environment associated with the second branch, the changes optionally including adding, modifying, or deleting files from the native file system.

In another aspect, the method may include assembling a first change set representing changes made to objects of the first branch, optionally assembling a second change set representing changes made to objects of the second branch, and optionally integrating the first and second change sets into an integrated change set that may include changes made to objects of the first branch, and changes made to objects of the second branch. Integrating the first and second change sets may be performed according to integration rules defining how objects of different types are to be integrated together.

In another aspect, the first branch optionally includes objects that are files, and the changes made to objects of the first branch may include information about files that have been added to, modified in, or deleted from the first branch. The second branch may include the objects from the first branch, and the changes made to objects of the second branch may include information about files that have been added to, modified in, or deleted from the files of the second branch. The changes made to objects of the first branch may be integrated with changes made to objects of the second branch according to a file integration rule specifying that the integrated change set optionally includes files from the first and second change sets while excluding files appearing in both the first and second change sets. In another aspect, the method optionally includes accepting user input to address conflicts between copies of the same files appearing in both the first and second change sets.

Further forms, objects, features, aspects, benefits, advantages, and examples of the present disclosure will become apparent from the accompanying claims, detailed description, and drawings provided herewith.

DETAILED DESCRIPTION

Figure 1:
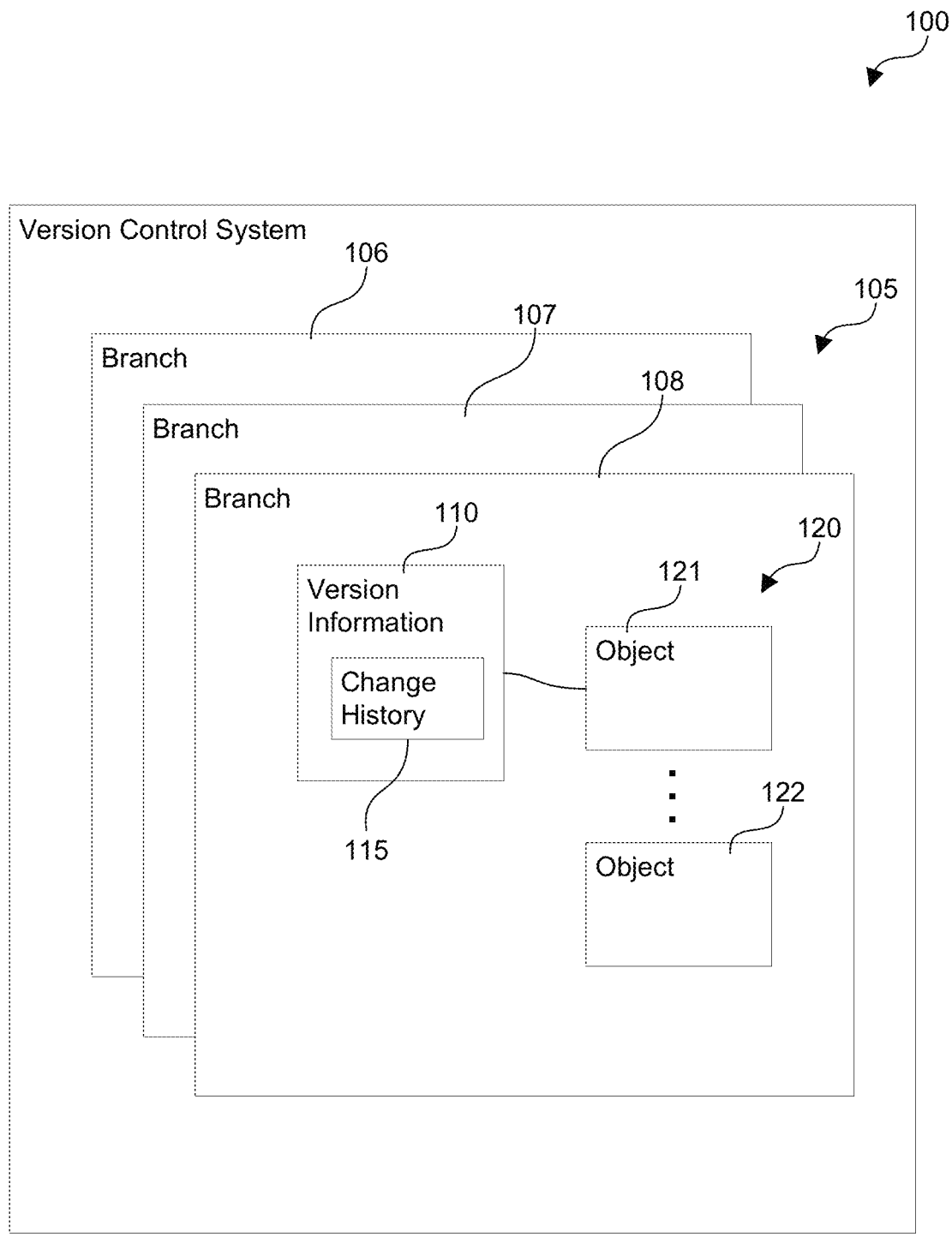
FIG. 1 is a component view of a version control system.

Illustrated in FIG. 1 is one example of a Version Control System (VCS) 100 implemented in software and executed by one or more processors of one or more computers. As discussed throughout, the disclosed version control system optionally addresses modification of objects under version control by assessing modifications to the objects themselves, as well as modifications to the overall context within which the objects are arranged and configured to operate or to otherwise have meaning. As a general principle, a change to an object may be thought of as meaningful within a given context. Alternatively, the context change, either along with a change to an object, or separately from it. If so, then capturing and propagating this contextual change is preferably accounted for as well so that changes to objects and/or the overall context may be captured when the object is committed. Conversely, other individuals or systems making changes to the same object within the same context are preferably made aware of both the change to the object and to the context within which the object is changed so that others may at least be aware of the change, and optionally can integrate the change as well.

Thus the disclosed system includes various examples of objects under version control within an overarching contextual definition by which all objects in the system can determine their relationship to all other objects thus allowing for notification when objects and/or aspects of the overall context shift. One example of this is shown at a high-level at 100 in FIG. 1. Version control system 100 includes branches 105 defining a context within which objects 120 operate or are otherwise meaningful. Information about the objects and the context within which they may be defined is optionally provided as version information 110 and may be associated with one or more objects 120.

The version information 110 may include data about changes made to the one or more objects represented in FIG. 1 as a change history 115, also referred to herein as a "change set". This data about changes may be represented in any suitable form indicating actions taken on specific objects in the branch, preferably available to be applied in sequence to another branch. This ability to optionally apply a change set to a branch provides the opportunity to change objects in an ordered and organized fashion thus allowing the state of objects in a branch to be adjusted to match the state of another branch as it existed at any given point in time. In one aspect, changes made to a branch may be represented as a change set to a baseline release of a branch with the result being a new release of the branch. This may be expressed formally as:

$$R=\{(x_1,\text{action}),(x_2,\text{action}), \ldots (x_n,\text{action})\}$$

where:
  $x_n$=separate objects in the branch
  actions=actions performed on or for the object (e.g. "add", "delete", "modify", etc.)
  R=the resulting new release In another aspect, data about the changes to objects in a branch may be thought of or represented as a list of changes to a current release of the branch. This list of changes may be formulated as a mapping of object identifiers to state values representing the current state of a given object. The state value may be representative of the current state of the object, and may also provide formation to the version control system by which the system may adjust the object from a first earlier state, to a second more recent state, or vice versa.

A change set may be applied to a current branch head to adjust the objects in a branch to a new state. This approach may be used, for example, to revert objects in a branch back to a former stage of development or to apply (or "overlay") changes from one branch to another branch. The disclosed system thus provides for this functionality by using a "change set application operation" that applies a change set to the current head revision of a branch. Changes defined in the change set are applied to the individual objects in the branch as defined by the change set resulting in a new head release. The new head release is preferably an object-by-object addition of the object, as it existed in the original head release but with each individual change applied to each object as specified by the change set.

The disclosed VCS may also be configured to determine the differences between two releases. This is one aspect, or example, of how the VCS may operate to determine changes to the overall context. This may be useful in comparing the state of objects in two separate branches to determine what is different between them. In another aspect, this difference calculation may be used to determine what changes need to be made to a branch to bring all of its objects into the same state as some other branch. In another aspect, differences in overall context may be determined by comparing differences in the relationships between objects, some of which may be defined outside of the version control system itself. This "diff" or "difference" operation may be configured to compare these and other aspects of two releases from one or more branches and to return a new revision that contains a change set indicating the differences between the objects and dependencies of the two releases. If the two releases are equivalent, then the result of the diff operation is an empty change set. The resulting change set may then be applied to another branch using the previously mentioned change set application operation to create a new head revision that incorporates the changes.

As disclosed herein, the object may be referred to as being "in" a branch thus signifying that the object is associated with the branch whether the object is physically or logically stored or maintained by the version control system such as by being stored in the same area of memory with other portions of the executing version control system, or in the same file system, or optionally in a shared database used by the version control system to manage its own internal data. In another aspect, version control system optionally includes copies of objects for given branch, along with change sets for those objects specific to a given branch that may be applied to the object. The version control system may optionally provide virtual links to objects thus allowing multiple different versions of objects to be accessed without copying a complete set of all versions of all objects to a local environment or file system.

Thus it may be possible for the disclosed version control system to provide version control to multiple objects "in" a branch without physically copying all the objects for a given branch into a live environment for a user to edit. A user may, for example, be presented with a user interface which provides the opportunity to edit files, movies, images, database tables or structures or records, and the like, without copying the entire set files or database structures etc. to a local copy.

As illustrated in FIG. 1, a version control system 100 may include one or more branches 105. The branches 105 may be associated with one or more objects 120. The version control system may include version information 110 that is linked to one or more objects 120 such as object 121 and object 122. The version information 110 may include information about the branch the related object is associated with. For example, version information 110 may be associated with branch 106, 107, or 108, or collectively with all objects 120.

The version control system 100 may be configured to perform different version control functions discussed herein. These functions include, but are not limited to, automatically detecting a conflict for a first copy of an object like object 121 that is associated with a first branch like branch 108. This conflict may be the result of changes made to another separate second copy of the object such as object 122 that is associated with a second branch like branch 107 that is different from the first branch. Separate branches may include copies of, or references to, different copies of the same object thus allowing multiple individuals to modify those objects separately and to be notified as conflicts develop, preferably in real time. In another aspect, the version control system 100 may be configured to update the version information 110 for the first copy (such as object 121) in a branch such as branch 108 to indicate the nature of the conflict.

In another aspect, the version control system 100 is implemented to automatically determine a conflict for objects 120 including object 121 and object 122 of a first branch 108 of the version control system 100. This conflict may be the result of changes made to objects 120 of a second branch like 106, or 107, and these objects 120 having separate copies of at least the object 121 or object 122 that have been modified. The version control system 100 may then automatically update version information 110 for the objects 120 in the branch 108 to indicate the nature of the conflict with objects in the second branch. The version information 110 may include a reference to the respective branch of branches 105 the object is associated with, and version information may include data about the changes made to the changed objects 120 in the other branches of branches 105.

Figure 2:
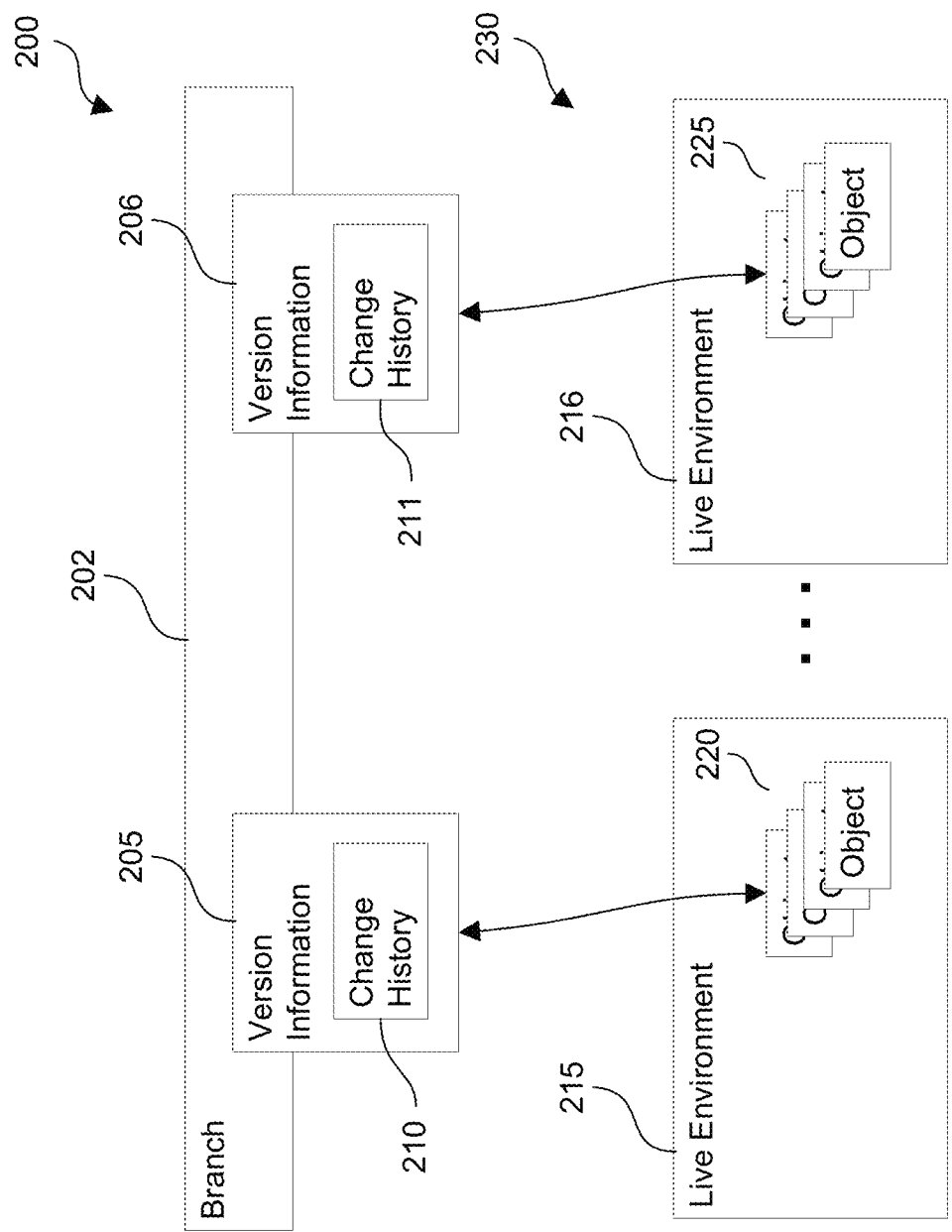
FIG. 2 is a component view of a version control system like the one shown in FIG. 1.

In another example illustrated in FIG. 2, a version control system 200 is shown that is like others disclosed herein that may be implemented in software executed by processors of one or more computers. A branch 202 may be associated with one or more objects 220 and objects 225. In these examples, version information 205 and version information 206 respectively are included with change history 210 and change history 211 providing storage and maintenance aspects of data about changes made to the one or more objects 220 and objects 225. FIG. 2 illustrates a single branch 202, but any suitable number of branches may be implemented and managed by version control system 200. In this example, branch 202 has or refers to objects 220 and objects 225 which are associated with a branch 202. The version information 205 and 206 are two examples of version information thus providing or collection and maintenance of information about objects in branch 202, and others like it. Here, as with other disclosed examples, branch 202 is configured to automatically detect conflicts between objects associated with branch 202, or objects associated with another branch of version control system 200.

In another aspect illustrated in FIG. 2, version control system 200 includes references to one or more live environment 215 and 216 here associated with branch 202. This allows branch 202 the opportunity to recognize and respond to modifications made to the objects 220 and 225 as they are made in the live environments 215 and 216. The version control system 200 may be configured to automatically update version information 205 and version information 206 associated with one or more modified objects 220 and objects 225 when changes are made in their respective live environments. Such changes include adding, deleting, or modifying objects in the live environment. Such modifications to objects in a live environment may occur as a result of a running process on another computer, manual changes made by a user, and the like.

Figure 3:
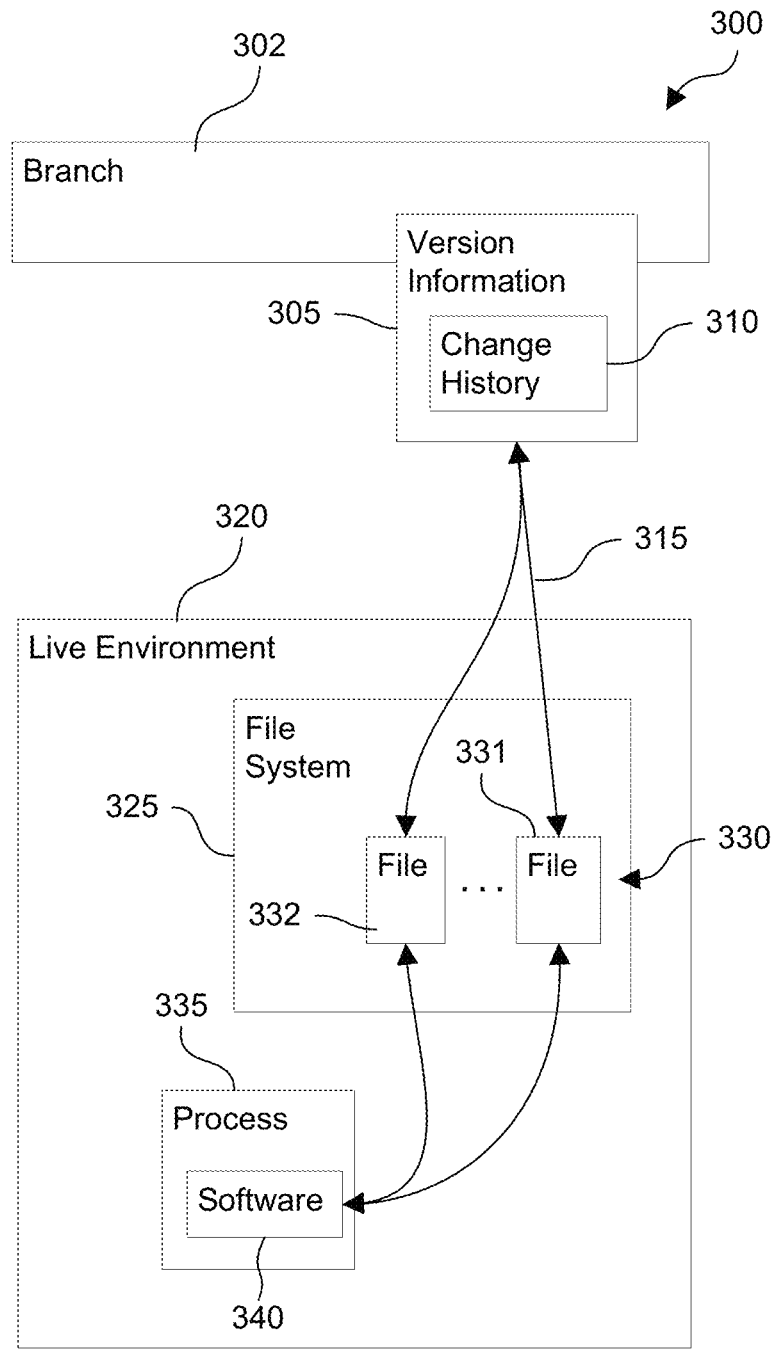
FIG. 3 is a component view of a version control system like the one shown in FIG. 1.

FIG. 3 illustrates another example at 300 of the disclosed version control system. In this example, version control system 300 includes a branch 302 having version information 305 associated with one or more objects, the version information 305 including a change history 310 for storing and managing data about changes made to one or more objects referred to by branch 302. Here, as with preceding examples, a single branch 302 is shown, however version control system 300 may include multiple branches like the one illustrated in FIG. 3, or any of the preceding figures.

As shown, one or more objects are associated with branch 302, and version information 305 provides information linking branch 302 with objects managed by version control system 300. As in the disclosed examples, version control system 300 may be configured to automatically detect a conflict for a first copy of an object associated with a first branch that is the result of changes made to another different object in another second branch. The object may, for example, be a second copy of the object that is associated with a second different branch, thus making this a "direct" conflict. In another example, the other object may be an object that the first object depends on, thus making this an "indirect" conflict. When this occurs, version control system 300 may be configured to update the version information 305 for either the first or the second copy of the object to indicate the nature of the conflict. Such information may include an ID for the objects involved, paths where the copies of the objects may be found, state variables associated with each object, and other information such as whether the conflict is a "direct" conflict, or whether it is a "contextual" or "indirect" conflict to name a few non-limiting examples.

FIG. 3 also illustrates that version control system 300 may include a live environment 320 associated with the one or more separate branches here represented as branch 302. Modifications to the objects managed by version control system 300 may be made in the live environment 320. In another aspect, the version information 305 and associated change history 310 that reference the modified objects may be automatically updated when changes are made in the live environment 320. Such changes may occur automatically result of an automated process, or manually as a result of updates made by a person modifying objects in the system.

In another aspect, live environment 320 may include a process 335 such as a process implemented as software 340 executing on a processor of a computer, or on multiple processors of multiple computers coordinating their efforts to work together. Such a distributed approach may be useful where large numbers of objects are managed by the disclosed version control system. Process 335 could optionally be of the following: application server to which the objects are deployed, an agent running locally of the disclosed version control system on the live environment, which controls how the objects are deployed, or a process, which needs to be invoked as part of an integration rule.

The process 335 may be programmed and configured to automatically modify objects in at least one of multiple live environments 320 as a result of software 340 executed by the running software process 335. The version control system 300 may be configured to automatically update the version information 305 for the objects in the live environment. In this way, version control system 300 may be configured to "watch" changes being made manually by user, automatically by an autonomous system, as a result of multiple users interacting with live environment 320, and the like. Thus conflicts may be automatically detected and various branches 105, branch 202, branch 302, and the like automatically updated to indicate conflicts as they occur.

In another aspect illustrated in FIG. 3, live environment 320 may include a file system 325 such as a native file system 325 implemented according to a particular operating system and executed by at least one processor of at least one computer. In this example, the objects include one or more files 330 such as file 331, and file 332, and others. Changes to the multiple objects may thus include adding, modifying, or deleting files 330 causing files to be added to, remove from, or changed in the respective branch associated with the live environment. In this example, version control system 300 may automatically update the version information 305 for the objects files 330 as they are changed in the live environment.

As discussed herein elsewhere, the files themselves may be discussed as being changed "in" a branch even though the files may be stored separately on another server, on the same server, in the same memory space, in a separate memory space, as needed. Thus live environment 320, process 335, version information 305, branch 302, change history 310, and other portions of version control system 300 may be distributed across multiple physical or virtual computing devices as needed. An object need not be physically part of a branch in any form but may be thought of as logically related to a branch as used herein.

Thus version control system 300 provides a software implementation for automatically determining a conflict for objects of one branch of a version control system that is the result of changes made to objects of some other second branch of the version control system. This can occur, as discussed above, where the branches of the version control system are different branches with separate copies of the same objects with version information in separate branches indicating different changes occurring in each branch. The version control system 300 may update the version information 305 for the objects in the first branch to indicate the nature of the conflict with objects in the second branch, and the version information 305 may include a reference to the respective branch the object is associated with along with change history 310 that includes data about the changes made to the changed objects in the second branch. In another aspect, version control system 300 may be configured to periodically identify changes made to files 330 in file system 325 of live environment 320 associated with the second branch. Such changes to the objects of the second branch may include files 330 in the file system 325 which are added, modified, or deleted from file system 325. In one example, version control system 300 is configured to determine changes made to files 330 at predetermined intervals such as an interval of less than 100 milliseconds, less than about 500 milliseconds, less than about five seconds, less than about 30 seconds, or at an interval that is greater than 30 seconds. This may be performed in any suitable way such as by polling file system 325 and checking for the existence of, modification of, or other attributes of files 330, or by the version control system receiving notification of modifications to files in the system, such as from the operating system.

In another aspect, file system 325 may be a separate and independent portion of executable code executed in live environment 320 but separately installed in live environment 320 in order to monitor changes to objects in the live environment and include those changes in change history 310 of version control system 300. In this aspect, process 335 may be thought of as a software "plug-in" insertable into live environment 320 either as a separate running process or as part of the normal execution of processes already running in live environment 320. For example, live environment 320 may include an application server process that is configured to modify files 330 in file system 325 as the application server response to request made by users. The application server process may include plug-in software 340 which may be executed as part of the application server process and may be thus configured to integrate closely with processes running in live environment 320 to increase efficiency and reduce or eliminate timing delays in reporting and updating changes to change history 310.

Figure 4:
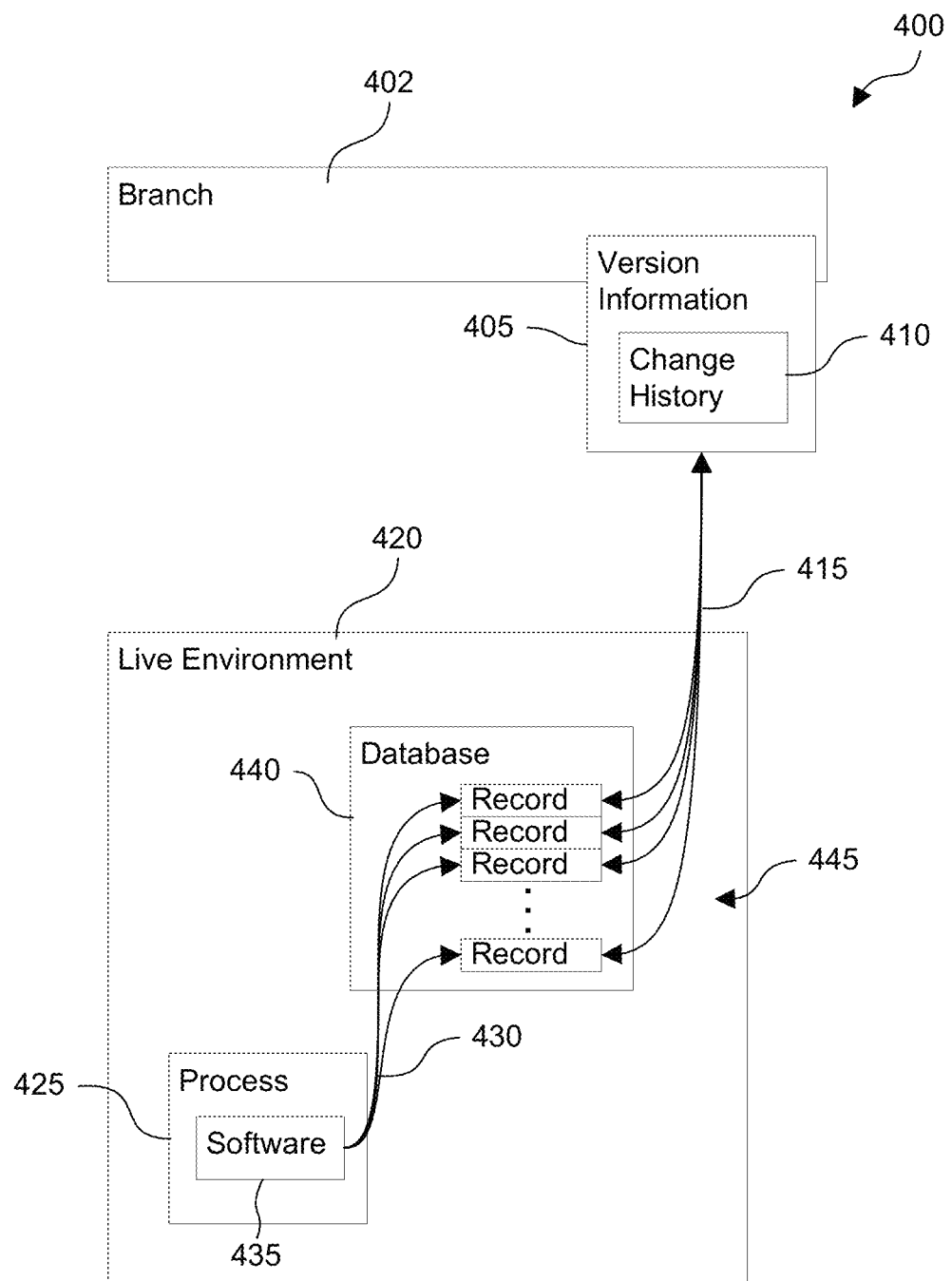
FIG. 4 is a component view of a version control system like the one shown in FIG. 1.

FIG. 4 illustrates another example of a version control system 400 that may be implemented in software and executed by one or more processors of one or more computers. The version control system 400 here includes a branch 402 having version information 405 associated with one or more objects, the version information 405 including a change history 410 for maintaining and tracking data about changes made to one or more objects referred to by branch 402. Here, as with the other examples provided, a single branch 402 is shown, however version control system 400 may include multiple branches as disclosed herein.

In FIG. 4, one or more objects are associated with branch 402, and version information 405 maintains information linking together branch 402 and objects managed by version control system 400. As in the preceding examples, version control system 400 may be configured to automatically detect a conflict for two separate copies of the same object in two separate branches. In another aspect, version control system 400, and the other version control systems illustrated herein may generally track changes between more than two copies of the same object, more than 20 copies, or more than 100 copies of the same objects in multiple branches thus allowing large numbers of individuals to contribute to a shared body of work simultaneously and independently by reducing or eliminating lost productivity due to numerous successive integration and test cycles. In another aspect, the version control system may be reducing or eliminating lost productivity due redundant integration where individual contributors are not made aware of changes to shared objects as they occur and therefore must engage in redundant time-consuming merging processes that may not effectively capture the overall state of the objects managed by the version control system.

When changes to objects in different branches occur, version control system 400 may be configured to update the version information 405 for the object that is changed, and/or for other instances of the changed object whether in the same branch or in different branches thus indicating, preferably in real time, the nature of the conflict. Such information may include whether the conflict is a "direct" conflict, or whether it is a "contextual" or "indirect," as well as details about what aspect of the objects have changed to name a few nonlimiting examples.

FIG. 4 also illustrates that version control system 400 may include a live environment 420 associated with the one or more separate branches here represented as branch 402. Modifications to the objects managed by version control system 400 may be made in the live environment 420. In another aspect, the version information 405 and associated change history 410 that reference the modified objects may be automatically updated when changes are made in the environment 420.

In another aspect, 420 may include a process 425 such as in the case of a database management system implemented in software 435 executing on a processor of a computer, or on multiple processors of multiple computers. Such a distributed approach may be useful where large numbers of objects are managed by the version control system. The process 425 may be programmed to automatically modify objects in at least one of multiple live environment 420 as a result of process 425 executed by a computing device. The version control system 400 may be configured to automatically update the version information 405 for the objects in the live environment 420. Thus version control system 400 may be configured to discover or be triggered by changes being made manually by users or automatically by running software processes executing in the processors of multiple other computers.

In another aspect illustrated in FIG. 4, live environment 420 may include a database 440 such as a relational database, object database, or other repository of data implemented in any suitable manner and executed by at least one processor of at least one computer. In this example, the objects include one or more database records 445. These database records 445 may be separately or collectively referenced according to record references 415 by which version control system 400 may determine when a record of database records 445 is modified, deleted, or added to database 440. Similarly, record references 430 may be used by process 425 to add, change, or delete records of database records 445. Here again, as discussed elsewhere, the records themselves may be thought of as being changed "in" a branch even though the individual records, columns, or other aspects of database 440 may be managed separately by a different software system executed in another computing environment, in the same computing environment, or any combination thereof. In this example the version control system may automatically update the version information 405 for the database records 445 as they are changed in the live environment 420.

Thus version control system 400 provides an example of a software implementation for automatically determining a conflict for objects of one branch of a version control system that is the result of changes made to objects of some other second branch of the version control system. In this example, objects in one branch may include database records 445 while objects in another branch (or the same branch) may include other types of object such as files 330 in a file system 325, and the like. This can occur, as discussed above, where the branches of the version control system are different branches with separate copies of the same objects, or where objects in separate branches include associations between files and individual database records 445 in a database 440 which may be included in version information 405 version information in the separate branches. In this way, complex relationships between multiple different types of data maintained across different types of computing platforms with different capabilities may be linked together in the version control systems disclosed herein. Thus version control system 400, and others like it disclosed herein, may be configured to manage changes to complex associations between multiple different branches thus allowing the branches to indicate the nature of the conflicts, and the nature of the conflict with objects in other branches as they occur.

In another aspect, 425 may be a separate and independent fragment of executable code executed in live environment 420 but separately installed to monitor changes to objects in the live environment so that those changes may be tracked by change history 410 of version control system 400. In this aspect, software 435 may be thought of as a software "plug-in" insertable into the database 440 of live environment 420 either as a separate running process or as part of the normal execution of processes already running in live environment 420. Such plug-in facilities may be provided by the database manufacturer to allow for various administrative or other functions. In this example, live environment 420 may include a database management process, or a cluster of such processes, running on one or more computers, that is configured to add, modify, query, or delete database records 445 based on commands received from other systems or users. The database server process may include plug-in software 435 which may be executed as part of the database process and may be thus configured to integrate closely with version control system 400 to increase efficiency and reduce or eliminate delays in reporting and updating changes to branch 402.

Figure 5:
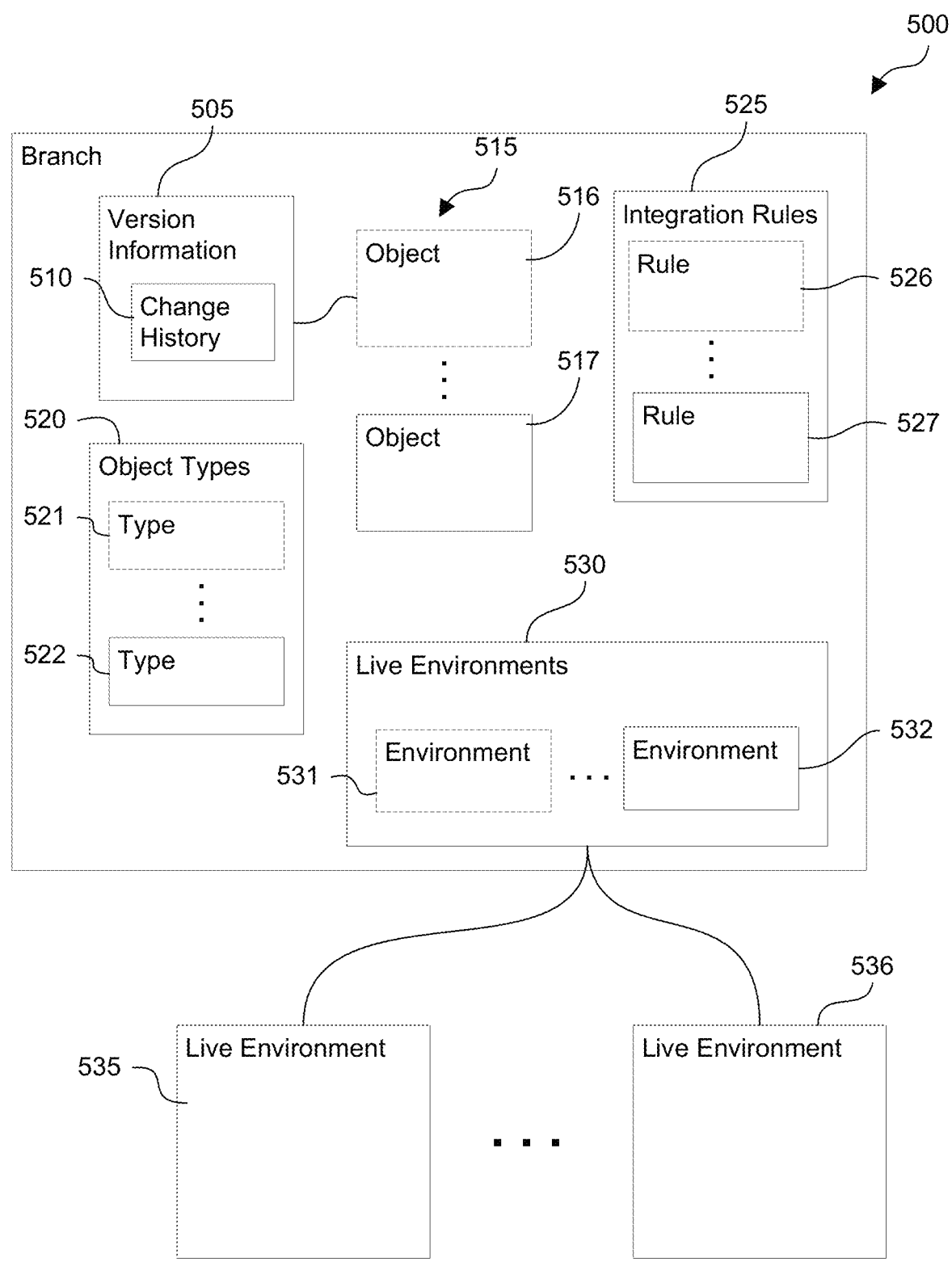
FIG. 5 is a component view of a branch like the ones shown in the preceding figures.

In another example of a branch 500 is illustrated in FIG. 5. The branch 500 may include a version information 505 tracking changes to versions of objects 515 associated with version information 505. The version information 505 may include a change history 510 useful for maintaining a history of changes made to objects 515 such as an object 516 and an object 517. In some configurations, version information 505 may be associated with a single object 516 or object 517, or may be associated with multiple objects 515. In another example, each object 516 or object 517 may be associated with a single version information 505 thus allowing change history 510 to be individually associated with individual objects 515. In another example, a single version information 505 may be associated with multiple change history 510 corresponding to multiple objects 515. In yet another example, multiple version information 505 records may be maintained by branch 500 individually associated with corresponding change history 510 and objects 515.

The branch 500, like other branch concepts disclosed herein, may optionally include one or more integration rules 525 that can configure the version control system to automatically integrate changes made in separate branches where possible. The integration rules 525 may include rule 526 and rule 527. The integration rules 525 may include triggering conditions and actions that may be automatically taken when the triggering condition is satisfied for a given object. In this way, the version control systems disclosed herein may be automatically configured to collapse and integrate changes made in separate branches together where possible such as in the case of when two branches have separate changes to different files that do not conflict. The disclosed system may automatically perform a "change set integration" operation where possible that merges multiple change sets belonging to parallel branches of the same type, such that integrated change set is formed by the union of the revisions from all of the branches and no changes between the revisions remain.

For example, where two different objects in two different branches are modified and do not rely on one another, either directly, or contextually such as by dependencies, a triggering condition of integration rule 526 may automatically detect that no direct conflict exists, and therefore the version control systems disclosed herein may automatically collapse changes from both branches into either branch are both branches so that the changes made by multiple contributors may be automatically merged in real time.

In another example, the triggering condition for one of rules 525 may be met, and the version control system may be configured to automatically notify users that an integration operation would be successful if taken immediately, but the action may not be automatically taken until confirmation is received from a user that integration is desired. In this way, automatic integration of changes made to objects in the version control system may be provided for either automatically or automatically with user confirmation. In another example, integration rules may include additional logic describing how child objects of different types are merged into a parent branch. For example, integration rules may be configured to transform objects of different types so that they may be translated or mapped into a parent branch. The integration rules 525 may include additional logic where branch 500 includes multiple different object types.

The branch 500 may also include object types 520 which may include an object type 521 and any other optional number of object types 520 such as object type 522. In specifying the object types 520, branch 500 provides for the opportunity to version control multiple different types of files including, but not limited to, text or binary files, database records, database schemas and configuration attributes, server and file system configurations, queries, audio, video, text, and others. The object types 520 may be correlated with integration rules 525 such that each live environment referenced at 530 may have a separate object types 520 associated with it, and may have multiple individual integration rules 525 associated with the different object types. Rules 525 may use information about object types 520 to determine how to automatically and efficiently organize and manage change sets from multiple branches simultaneously by multiple contributors so that changes are not lost and are sufficiently integrated with as little extra effort as possible.

The branch 500 may include live environment references 530 that may optionally refer to her include any suitable number of a live environments such as 531 and 532. As illustrated here, and discussed throughout this disclosure, the live environments referred to by live environment 531, and live environment 532 may be thought of as being associated with branch 500, or "in" branch 500, while the live environment 535, and live environment 536 may be on a physically separate computing device, or on the same physical machine but operating as a separate software process executing on the same or different processors. For example, the live environment 536 may be an application server, while live environment 535 may be a developer workstation, and branch 500 may be managed by the disclosed version control system executing on yet a third server connected to the live environments via a computer network. Any suitable combination of processors, computing devices, and other electronic hardware may be used in implementing the disclosed version control systems and live environments.

In another example, live environment references 530 may include or be implemented as, a set of aliases to which objects 515 can be deployed to or uploaded from. For example, live environment 535 may include a collection of one or more objects 515 deployed from branch 500 to the live environment 535 where an external process operating on a computing device and executed by a processor may cause modifications to objects 515 during the execution of the process. These changes to objects 515 may then be uploaded from the live environments referenced at 530 into branch 500 where one or more version information 505 and change history 510 may be updated to give the version control system a window into the changes made by the automatic operation of the external process. This deploy and upload cycle may occur automatically as facilitated by the version control system operating in tandem with the executing process. In this way, other branches of the version control system may be notified when objects 515 under management of the version control system are changed in real time. These changes to the modified objects may then be incorporated into changes with other branches either automatically according to integration rules 525, or upon confirmation as provided by integration rules 525, or manually after notification as provided by the version control system disclosed herein.

Figure 6:
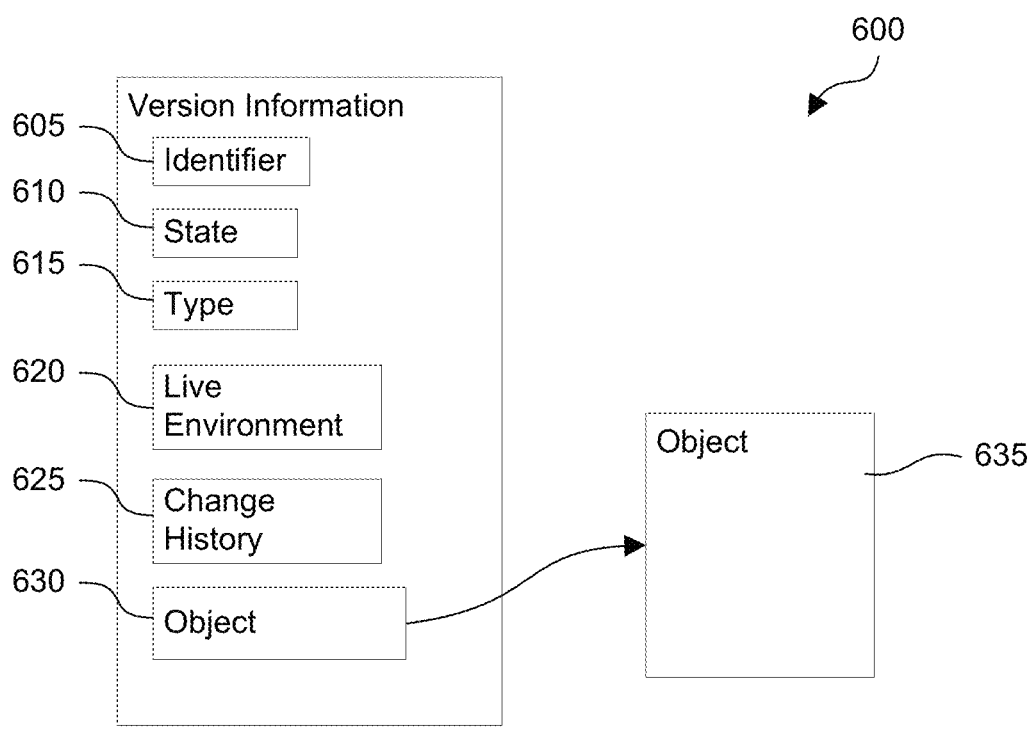
FIG. 6 is a component view of version information like those shown in the preceding figures.
Figure 7:
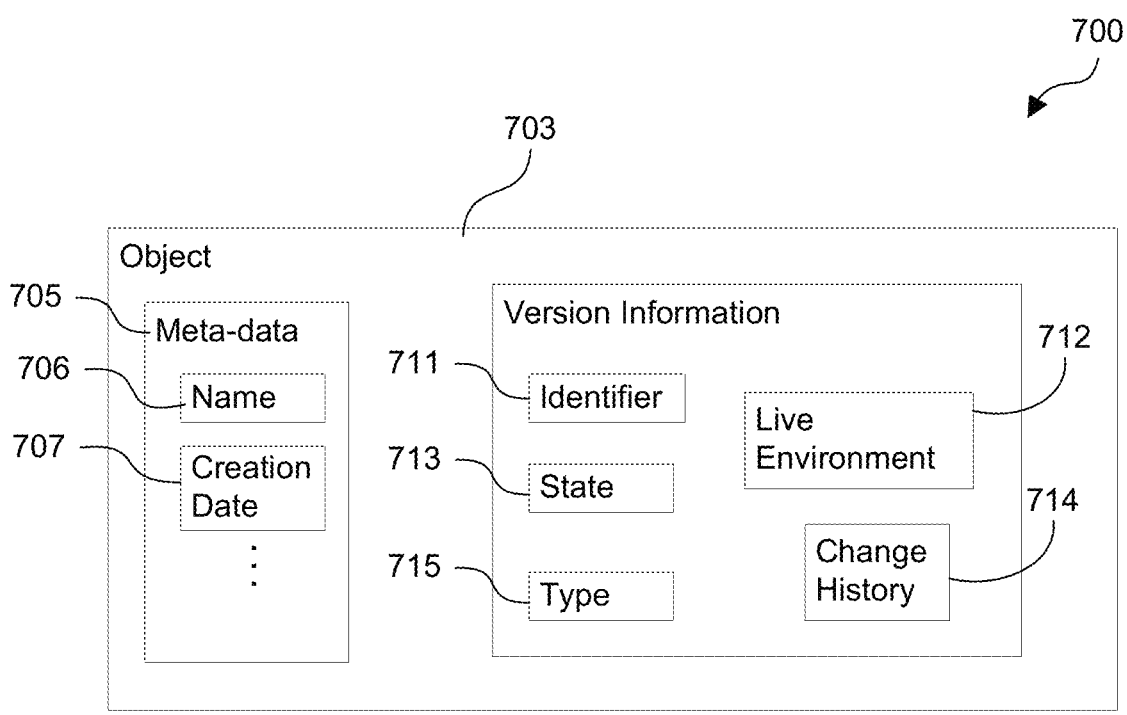
FIG. 7 is a component view of version information like those shown in the preceding figures.

FIGS. 6 and 7 illustrate examples of how version information may be maintained about objects managed by the disclosed version control system. A version information 600 in FIG. 6 may include and identifier 605 that may uniquely identify the object 635. The version information at 600 may also include a state 610 which may be configured to specify the state of version information 600, the state of object 635, or both. The state information may include different state values indicating whether the object 635 referred to by version information 600 has been modified, newly added, or deleted. Other state values may be associated with version information 600 as well. In another aspect, the state value may be updated when an object is committed, the state value optionally configured to capture the content and type of change, and optionally the resulting object. For example, the state value may be captured as a hash code incorporating properties of the object in the resulting code. The hash code may then be compared against other hash codes for other objects to determine aspects of the change that resulted in the current state.

The version information 600 may also include a type 615 specifying and indicating information about object 635 associated with version information 600. For example, type 615 may indicate that object 635 is a text file, computer source code, a shared library, a source code library, a database table, database record, or any other suitable type of object that might be managed by the disclosed version control systems. A live environment reference 620 may be included as discussed elsewhere herein referring to a live environment object 635 is associated with, if such an association exists. The version information 600 may also include a change history 625 indicating changes made to object 635 over time that were registered and recorded by the version control system. These may be maintained as a change set like those discussed in detail herein. These changes may be individually recorded as separate identifiable changes made to object 635. These changes may also be atomic such that they may be applied in the recorded order to object 635 thus allowing the state 610 of object 635 to be manipulated as necessary to merge, update, rollback, or roll forward changes to object 635 as needed. The change history 625 may include information about different values for state 610 as state 610 changes over time when changes are made to object 635.

The version information 600 may also include an object reference 630 associating one or more objects 635 with version information 600 as disclosed herein elsewhere. Object reference 630 may be any suitable type of reference or identifier, or other association that is configured to link object reference 630 with object 635 so that version information 600 may be used by the version control system manage and track changes made to object 635. Thus the actual object reference 630 may be separate from and referenced by version information 600. In another aspect, identifier 605 may uniquely identify object 635, or may optionally identify object 635 collectively along with other identifying information included in version information 600 such as state 610, type 615, and aspects of change history 625 along with optionally other information specific to object 635 such as filename, table name, etc.

Another example of version information that may be used by the version control system disclosed herein, includes a version information 700 which may be associated with an object 703. In this example, object 703 includes a metadata 705 containing information about object 703 such as a name 706 a creation date 707, and the like.

In this example, the version information 700 may be incorporated into object 703 along with, or as part of, other portions of the object similar to metadata 705. A version control system like those disclosed herein may add 700 to object 703 when it is initially uploaded into the version control system. This may be done, for example, by adding the version information 700 as a header, or metadata field, or similar structure to the object. In this way, version information 700 may be associated with object 703 such that version information 700 is implicitly included with object 703. An identifier 711 may be included to uniquely identify 703 from other objects like it is the version control system.

The version information 700 may also include a type 715 specifying and indicating information about object 703 associated with version information 700. For example, type 715 may indicate that object 703 is a text file, computer source code, a shared library, a source code library, a database table, database record, and any other suitable type of object that might be managed by the disclosed version control systems. A state variable 713 may maintain information about the state of the object 703. A live environment 712 (or live environment reference) may be included as discussed elsewhere herein referring to a live environment object 703 is associated with, if such an association exists. The version information 700 may also include a change history 714 indicating changes made to object 703 over time that have been recorded by the version control system, or branch of the version control system object 703 is associated with. The change history 714 may include individually identifiable separate records of changes to state 713 as they occur over time when changes are made to object 703. In this way, changes to object 703 may be applied in the order recorded in change history 714 so that the state 713 of object 703 may be manipulated as needed by the disclosed version control systems to manage uploads, merges, roll forward, rollback, and other similar procedures. In another aspect, identifier 711 may uniquely identify object 703, or may optionally identify object 703 collectively along with other identifying information included in version information 700 such as state 713, type 715, live environment 712, or other information related to object 703 such as metadata 705. As with version information 600, the state 713 may be updated when an object is committed, the state value optionally configured to capture the content and type of change, and optionally the resulting object. For example, the state value may be captured as a hash code incorporating properties of the object in the resulting code. The hash code may then be compared against other hash codes for other objects to determine aspects of the change that resulted in the current state.

FIGS. 8 through 17 illustrate various examples of the disclosed version control systems in operation. Some implementation specifics are included as well to explain the operational aspects. In one aspect, the basic VCS structure may be implemented as a graph of branches, each branch preferably having an initial snapshot (initial "head" release or "baseline") of a set of objects followed by a series of changes (also referred to as "deltas" or "revisions") to the original or initial snapshot. The changes can be stored in the same branch or to a separate child branch. If a change set is stored in a child branch, the initial snapshot for the child branch (its baseline) is the current head of the parent. In another aspect, where a child branch contains the changes from the parent branch, the child branch may contain only a subset (the change set) of the parent branch, thus reducing the resources consumed by the child branch.

Figure 8:
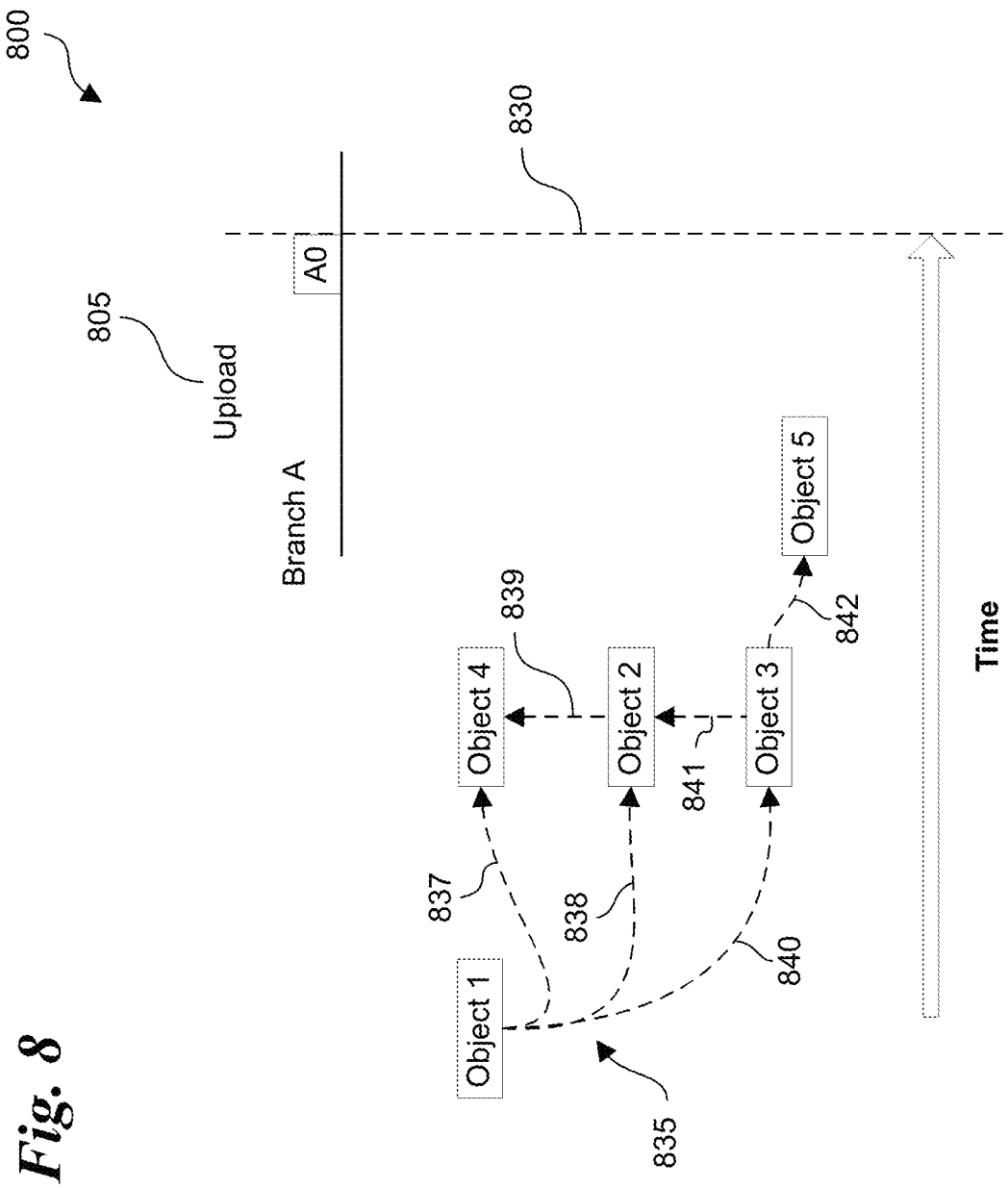
FIG. 8 is a sequence diagram of one example of a version control system in use.

Illustrated at 800 in FIG. 8 is one example of an initial upload operation 805 which may be performed to "import" one or more objects into a version control system as the concept is understood throughout this disclosure. In another aspect, the import operation may be thought of as an initial step by which one or more objects are "brought under" version control, or "brought into" a version control system as disclosed herein.

In the example of FIG. 8, multiple objects are uploaded into a Branch A such that at time 830, Branch A has an initial revision A0 that includes the uploaded Objects 1-5. In this example, the uploaded Objects 1-5 include object dependencies 837-842 which are optionally captured and maintained by the disclosed version control system so as to manage relationships between objects and any conflicts resulting that may result from these dependencies.

The illustrated dependencies provide insight into how the objects are related to each other. In one aspect, a dependency indicates a referential relationship between two objects. For example, a dependency 838 is shown between Object 1, and Object 2. Here, it may be generally said that some aspect of Object 1 depends on one or more aspects of Object 2. In another aspect, the dependencies may be hierarchical as shown here. For example, an aspect of Object 1 may depend on one or more aspects of Objects 2, 3, and 4 as indicated by dependencies 838, 840, and 837 respectively. In another aspect, aspects of Object 2 may depend on aspects of Object 4 as illustrated by dependency 839. Similarly, Object 3 optionally depends on Object 2 and Object 5 as shown according to dependency 841, and 842 respectively. As shown in this example, dependencies may be defined in the version control system as an acyclic directed graph whereby dependencies can be efficiently searched to automatically determine a dependency context for the objects in the branch. The version control system as disclosed herein may thus efficiently watch for changes in not only the objects themselves, but changes to objects in other branches that those objects depend on, thus allowing the system to track complex relationships between changes made in separate branches as they occur, or as they are committed to the separate branches.

As illustrated in FIG. 8, the objects and the relationships between them are defined and uploaded resulting in a new revision A0 at time 830. In this example, revision A0 is also referenced as a "head revision" as it is the most recent set of committed changes in Branch A (signified by the box drawn around the revision number "A0").

The concept of a "direct conflict" as used herein generally refers to the instance where two copies of the same object are changed in two different revisions or change sets of two separate branches. This can occur, for example, where two authors or automatic processes are modifying different copies of the same object in separate branches. In another aspect, the two branches may share a common baseline (i.e. common set of objects). Stated more formally, two releases, preferably with a common baseline root, have a set of direct conflicts C(r1, r2) as follows:

$$C(r1,r2) = \text{All } x \text{ in } \{r1 \cap r2\}, \text{ such that diff(baseline} + x_{r1}, \text{baseline} + x_{r2}) \neq \text{Identity}$$

where:
$r_1$=the first release
$r_2$=the second release
x=an object in $r_1$ and $r_2$
baseline=common baseline of both $r_1$ and $r_2$
diff=difference operation as disclosed herein The concept of an "indirect conflict" as used herein generally refers to the instance where some aspect of an object such as Object 2 in FIG. 8 is changed in a branch (for this example, Branch C) while an object that depends on an aspect of Object 2, such as Object 1 is, for example, present in a different branch (for this example, Branch B). This may result in an indirect conflict being reported to Branch B when changes to Object 2 are committed to Branch C—even though Object 2 may not even be in Branch B and no modifications were introduced to Branch B. This is because the disclosed VCS may be configured to detect and report those instances where aspects of an object have changed that another object depends on, even when the changed object is a different object in another branch.

In one example, Objects 1 and 2 are both source code which are part of a larger software system, and the aspect of Object 2 that Object 1 depends on is a function "getName( )" that Object 1 calls in the execution of its functions. In removing this function from Object 2 in Branch C, no direct conflict results because the change occurred in Object 2, and Object 2 may not even be in Branch B and no modifications were introduced to Branch B. However, if and when the changes to Objects 1 and 2 are integrated into a parent branch (for this example, Branch A), the source code will fail to function properly because Object 1 would still call getName ( ) of Object 2, but no such function now exists.

In this example, one object depends on the presence of a specific or identifiable portion of another object. Such a dependency related conflict as a missing function, in the case of computer source code, may easily be identified by attempting to build the full project, such as in preparation for a production release. The combination of modified Object 1 and Object 2 as discussed above would generally result in a compiler error.

In another example, Object 2 may be a setting, chapter, section, dialogue between two characters, the description of an event, or some other identifiable portion of a manuscript such as in the case of a novel. Object 1 may be a separate portion of the manuscript that refers to the identifiable portion referenced by object 2. Thus, removing or changing Object 2 leaves Object 1 in an untenable state because Object 1 now refers to an aspect of the manuscript that no longer exists.

In another example, Object 1 may be maintained by the version control system and may represent a character "Chris", and Object 2 may be also maintained by the VCS and may represent a character "Erica." Further in this example, Branch B may be created only with a copy of Chapter 22 of a literary work, and Branch C may be created only with a copy of Chapter 31. Text in Chapter 22 refers to Chris (in a certain state, say 'married to Erica'). If Chapter 31 removes Chris (or modifies his state to make him "single"), both chapters 22 and 31 cannot now be integrated into a single literary work. This is an example an object dependency that may be tracked by the VCS so as to alert authors working in separate branches that changes have occurred to dependent objects in other branches that need to be addressed in order for the objects and the relationships between objects to remain in harmony.

Other examples of dependencies that may be monitored by the disclosed version control system include tracking changes to aspects of a database such as the addition or removal of columns to a table, changes to table names, changes to schemas, materialized views, indexes, or other aspects of a database which may be depended upon by other objects under version control.

In another example of an indirect conflict, Objects 1 and 2 are both source code and part of a larger software system, and the aspect of Object 2 that Object 1 depends on is a function "getName ( )" that Object 1 calls in the execution of its functions. However, rather than removing the getName function from Object 2 in Branch C, the contents of the function are modified in Object 2 in Branch C. Here again, no direct conflict results because the change occurred to the functionality provided by Object 2. Object 2 may not even be in Branch B and no modifications were introduced to Branch B, neither are any specific identifiable portions removed from Object 2 in Branch C. However, if and when the changes to Objects 1 and 2 are integrated into a parent branch (for this example, Branch A), the software system may fail to function properly because Object 1 would still call getName ( ) of Object 2, but the behavior of this function has changed and therefore the results may only be verifiable through testing the outcome of calls to getName ( ) made to Object 2 by Object 1.

This is an example of a dependency where one object depends on the presence of a specific or identifiable behavior of another object. Such a dependency related conflict as changes to the behavior of another part of the system, in the case of computer source code, may not be easily identified by simply building the project. Compilers generally do not execute the code looking for specific outcomes based on specific inputs as this type of testing is generally left to a separate quality control process. The combination of modified Object 1 and Object 2 as discussed above may not result in a compiler error, and therefore may go undetected until errors are experienced by users either in testing or in production.

In the context of a literary work previously discussed, Object 2 may be a setting, chapter, section, dialogue between two characters, the description of an event, or some other identifiable portion of a manuscript such as for a novel. Object 1 may be a separate portion of the manuscript that refers to events, conversations, settings, thoughts, dialogue, or other aspects of the manuscript which may be contained within the identifiable portion referenced by Object 2. Thus, even though Object 2 is still in the manuscript, changing substantive aspects of that portion of the manuscript that Object 1 depends on may leave Object 1 in an untenable state. Object 1 may now, for example, refer to conversations that now never happened, or details about events that are no longer relevant, to name a few examples.

Other examples of functional dependencies that may be monitored by the disclosed version control system include tracking functional changes to aspects of a database such as changes to the processing steps defined in the body of a database trigger, changes to the substantive actions taken by database stored procedure, changes to the number of characters allowed in a record field, or other functional aspects of a database which may be depended upon by other objects under version control.

In another example, Object 1 may be a source code file for a computer program and may depend on a shared library in order to compile and execute. That dependency may be signified by dependency 838 in the case were Object 2 includes the shared library. Maintaining information about this structural or "compile time" dependency thus allows the system to monitor updates to the shared library that affect other objects under version control in other branches, and to notify users of the system when changes occur to Object 1 that effect the relationship between Object 1 and Object 2.

In another example, Object 3 may be a database table that requires records in another database table, Object 5 in this example, in order to maintain referential integrity of the data in Object 3. This relationship as indicated by dependency 842 allows the version control system to track relationships between objects that may not be enforced by an external procedure such as a compiler, but rather may be defined "dynamically" or within a functional or operational context as discussed above. That is to say, the relationship may be one that is only relevant with a given context, such as when a system that uses the objects is operating, or is being tested. Without this aspect of the disclosed version control system, it may not be otherwise clear that the relationship between objects exists, or that a conflict has been introduced until the system executes within a given context in a live environment, and the output is compared with the expected output. The disclosed version control system accepts input defining these complex relationships and may therefore be configured to maintain knowledge of the context within which two objects are designed to operate, and notify users when the parameters of that operational context changes, and thus the parameters of the relationship between objects has also changed, an event that may result in a conflict with other changes.

In another example, Object 2 is changed in a branch (for this example, Branch C) while an object that depends on an aspect of Object 2, such as Object 1 is, for example, present in one of the parent branches of C (for this example, Branch A). This may result in an indirect conflict being reported to Branch C and Branch A when changes to Object 2 are committed to Branch C—even though Object 2 may not even be in Branch B and no modifications were introduced to Branch B.

Stated more formally, the disclosed VCS may determine indirect conflicts by first defining a context ß as a hierarchy of object types $Type_1 < Type_2 < Type_3 < \ldots Type_n$. For any release $R=\{x_1(action), x_2 (action) \ldots x_n (action)\}$ and a context ß, we can construct a $R^\beta$ by adding R's dependencies of all types $t_i \le t_k$ contained in R. Two releases can be said to have a set f indirect conflicts $C^\beta (R_1, R_2)$ as follows:

$$C^\beta(R_1, R_2) = \{R^\beta_1 \cap R_2\} U \{R^\beta_1 \cap R^\beta_2\} \text{ for all objects updated in } R_1$$

where:
$R_1$=the first release
$R_2$=the second release

Figure 9:
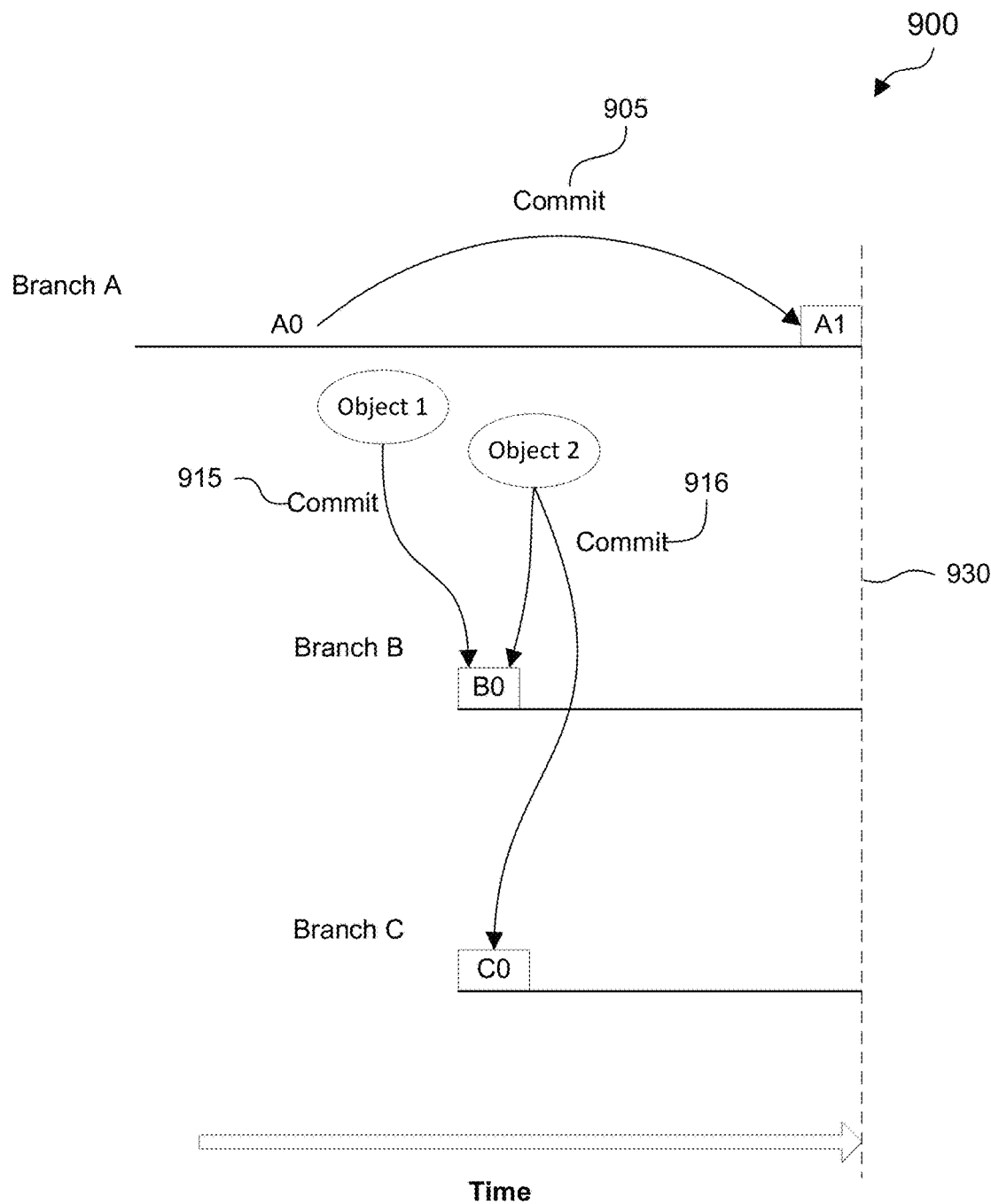
FIG. 9 is a sequence diagram of illustrating additional operations of the version control system shown in FIG. 8.

Illustrated at 900 in FIG. 9 is another example of the disclosed version control system in operation along the lines of what is discussed above, particularly where modifications made to one branch are committed to separate other branches. A modified copy of Object 1 is shown along with a modified object of Object 2, both of which are modified in Branch A after the initial upload at revision A0. A commit operation 915 and a second commit operation 916 are then executed and two new branches are created accordingly. In this example, changes made to Object 1 in Branch Aare committed to a Branch B resulting in a new head revision B0. Changes made to Object 2 in Branch B are committed to a Branch C resulting in a new head revision C0. Optionally, another commit operation 905 may be executed in the original or "parent" Branch A thus committing changes to Object 1 and Object 2 as part of a new revision A1 which then also becomes the head revision for Branch A.

In this example, the disclosed version control system is optionally configured to commit modifications made in one branch into one or more other new or existing branches. These new branches B and C may be created as a result of the commit operation 915 and commit operation 916, and may optionally operate as, and/or be thought of as, "child" branches of Branch A. This parent-child relationship may be maintained by the version control systems disclosed herein thus making it possible for the system to monitor changes to objects under version control in either the parent or the child branches and to notify users when changes occur so that conflicts may be address and the changes may be integrated accordingly. Also in in this example, the disclosed version control system may be configured to create an initial head release or initial snapshot of the individual objects associated with a branch, where the initial snapshot has version information for the individual objects that includes data about changes made to those objects in the past, such as in the parent branch. Those changes may, for example, be imported from a parent branch like Branch A when a new Branch B is created as a result of a commit operation. In that example, version information for the individual objects committed to the new branch may be held in the child branch while also being maintained in the parent branch as indicated in FIG. 9. In this way, child branches may include one or more revisions of a parent branch. This allows for changes to be made by one user, which may then be separated out into multiple separate other branches which may then be further acted on by other users. As disclosed throughout, the version control system may then monitor the changes made in all three branches and report to each of the three separate users as changes are made thus allowing all users to efficiently collaborate in parallel without adversely affecting each other's ability to actively make progress as a team.

Figure 10:
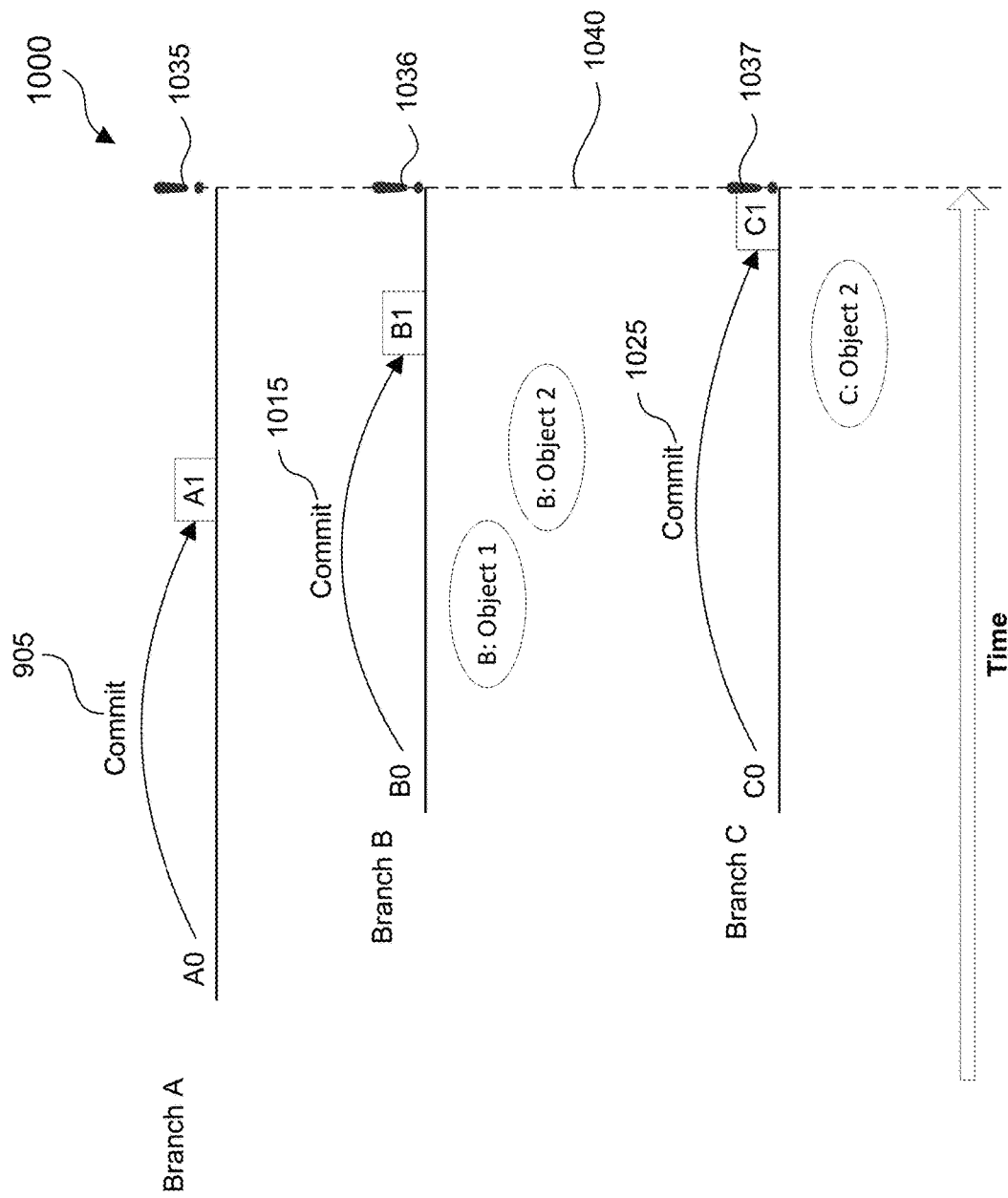
FIG. 10 is a sequence diagram of illustrating additional operations of the version control system shown in FIGS. 8 and 9.

Looking at FIG. 10, branches 810, 920, 921 are shown as additional work is performed on each branch and committed thus resulting in automatic notification of conflicts at time 1040. Looking at Branch B, additional changes are made to modified copy of Object 1, and revised copy of Object 2, both in Branch B. These changes are committed to Branch B by commit operation 1015 resulting in a new revision B1 that is now the head revision for Branch B. At this point, the disclosed version control system registers no conflicts in branches 810 and 921 as no conflict exist. However, perhaps without the knowledge of those working in Branch B, others may have modified Object 1 in Branch C resulting in a modified copy of Object 2 in Branch C. The changes to Object 2 in Branch C are committed to the version control system by commit operation 1025 resulting in a new head revision C1. At this point in time, branches 920 and 921 have committed changes to different copies of the same Object 1.

Upon the commit operation and creation of the head revision C1, three separate notifications 1035, 1036, and 1037 may be sent by the version control system to branches A, B, and C respectively. Checks for direct and indirect conflicts between objects in the different branches may be configured to occur whenever a commit operation is performed. Notification 1035 may be directed to Branch A indicating that changes have been made to Objects 1 and 2 in Branch B, and that other changes were made to Object 1 in Branch C. Notification 1035 to the parent Branch A of actions taken in child branches may be useful to organize further activities in the parent branch such as to update the parent with changes from one or both of the child branches, or to accept changes from one child branch and not the other, or to hold off integrating changes from either branch until, for example, further testing is performed, other changes are committed from a third child branch, and the like.

In this example, the notification 1035 for Branch A includes notice of direct and indirect conflicts with Objects 1 and 2 in Branches B and C. Objects 1 and 2 in Branch B include changes to two different copies of the same Object 1 in separate branches A and B thus resulting in 1035 including a notice of a direct conflict between revisions A1 and B1 of Branches A and B respectively. Notification 1035 also includes notification of indirect conflicts between revisions A1 and B1 because B1 includes changes to Object 2 which Object 1 depends on. In operation, the system may compare the identifiers of changed objects in revisions A1 and B1, and the associated state values for Object 1 in both revisions, and then register a direct conflict when the identifiers for Object 1 match but the state values in each branch head release do not. Notification 1036 for Branch B includes direct and indirect conflict notifications. Upon the commit 1015, B1 now includes changes to Object 1 which differ from Object 1 in Branch A. Thus Branch B is notified of the direct conflict with the head release of Branch A. Also, Branch B is notified of a direct conflict with Object 2 in Branch C because releases B1 and C1 of branches B and C contain different copies of the same Object 2. Branch B may also be notified of an indirect conflict at 1036 where the VCS detects changes to Object 2 in Branch C, and as mentioned previously, Object 1 depends on Object 2. Thus Branch B also has an indirect conflict between the B1 and C1 releases.

In another aspect, another notification of conflicts 1037 may be directed to Branch C indicating that as of the commit 1025 in Branch C, Object 2 is now in direct conflict with Object 2 in Branches A and B, and that changes to Object 2 in Branch C now create indirect conflicts in Branches A and B as well as both Branches A and B include Object 1 which depends on Object 2. These and other details about the direct and indirect conflicts may be included in notifications 1035, 1036, and 1037.

FIG. 10 thus illustrates an example where a first object is associated with the first branch, and a second object is associated with the second branch, and the first and second branches are different. In another aspect of FIG. 10, the first branch, and the second branch share a common parent that is also separate from the first and second branches. Here also, the version control system may operate by noting the identifiers that uniquely identify each object, and state values that include information about the current state of each object, such as an indication that they have been modified or are in conflict. The state values of revised objects associated with the first and second branches may have the same identifier but state values that do not match and thus a direct conflict may be registered. In another aspect, the identifiers for dependent objects may be compared in a similar way to determine indirect conflicts for dependent objects. In another aspect, changes to objects in Branches A, B, and C may continue as the objects in the separate branches may not necessarily be locked when conflicts occur thus allowing development to continue, with the knowledge that conflict resolution and integration of changes in other branches will be needed at some point in the future. This allows for notification of a conflict, the nature of the conflict, at the time the conflict occurs so that development can continue but integration with other branches may also continue at any time as each user of the separate branches sees fit.

Figure 11:
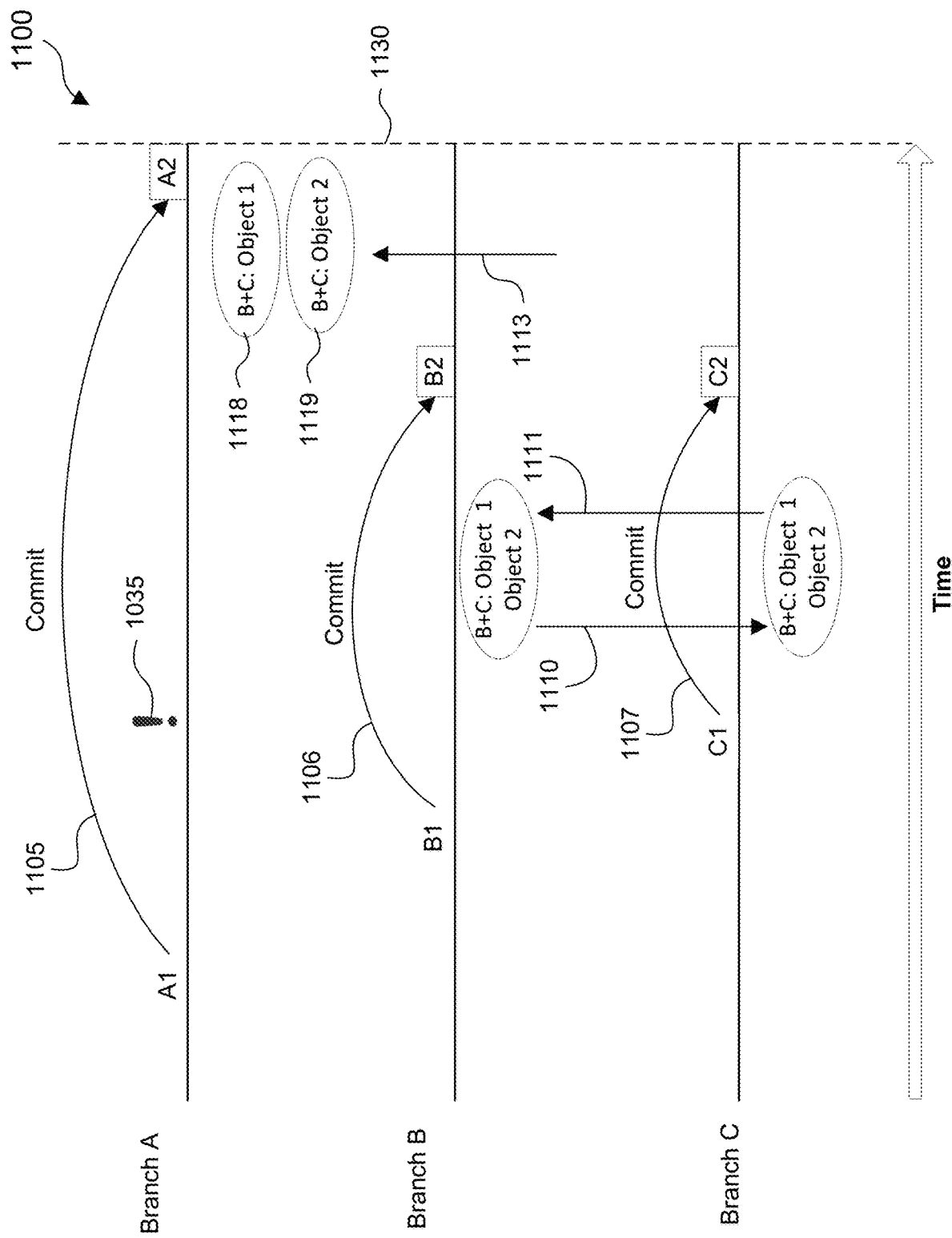
FIG. 11 is a sequence diagram of illustrating additional operations of the version control system shown in FIGS. 8-10.

An example of conflict resolution and integration between branches for the disclosed system is illustrated in FIG. 11 at 1100. Several conflict resolution and/or integration operations are shown whereby changes made in separate branches and the resulting conflicts are resolved and/or collapsed together to resolve conflicts raised by the system as illustrated in FIG. 10 and to create a new head release A2 of the parent branch that includes all of the changes from the "child" Branches B and C. For example, Objects 1 and 2 in Branch B are the result of conflict resolution and/or integration operation 1111 combining changes made to Objects 1 and 2 in Branch C with changes made to Objects 1 and 2 in Branch B. Similarly, Objects 1 and 2 in Branch C are a result of conflict resolution operation 1110 where changes made to Objects 1 and 2 in Branch B are included into Objects 1 and 2 in Branch C along with the changes already made previously in Branch C.

Thus at the time head releases B2 and C2 are created as a result of commit operation 1106 and 1107 respectively, no conflicts exist between Branches B and C. The disclosed version control system may update the state variables for Object 1 and Object 2 in the head releases of Branches B and C to indicate that updated copies of Object 1 and Object 2 have been committed and now both branches have the same state values for these objects and thus the head revisions of these branches are no longer in conflict. Similarly, the state variables for dependent objects such as Objects 2, 3, 4, and 5 are now also the same thus eliminating contextual conflicts that may have been present.

However, the warning notification conflict 1035 in Branch A is still in effect as Branch A has older copies of Object 1 and Object 2 and thus both are still in conflict with the modified copies in Branches B and C which are now in sync with each other (i.e. no longer in conflict). To remedy this situation, conflict resolution and integrate operation 1113 may be executed causing integrated objects 1118 and 1119 from Branch B or C (or both) to be incorporated into Branch A. A commit operation 1105 may then be executed for Branch A resulting in a new head revision A2. Here, as with other examples discussed herein, the disclosed version control system automatically updates copies of the files and updates the version history and current state information for objects in Branch A. The system may then traverse the change histories and consider the current state values for all objects in all three branches and determined that no new conflicts exist as all objects with the same identifiers now have the same state, and no objects are changed that are depended on by other objects. Thus no new warning notifications may be issued at time 1130 are all three branches are synchronized. Development may now continue in all three branches with conflicts being determined and indicated as illustrated as disclosed herein.

Figure 12:
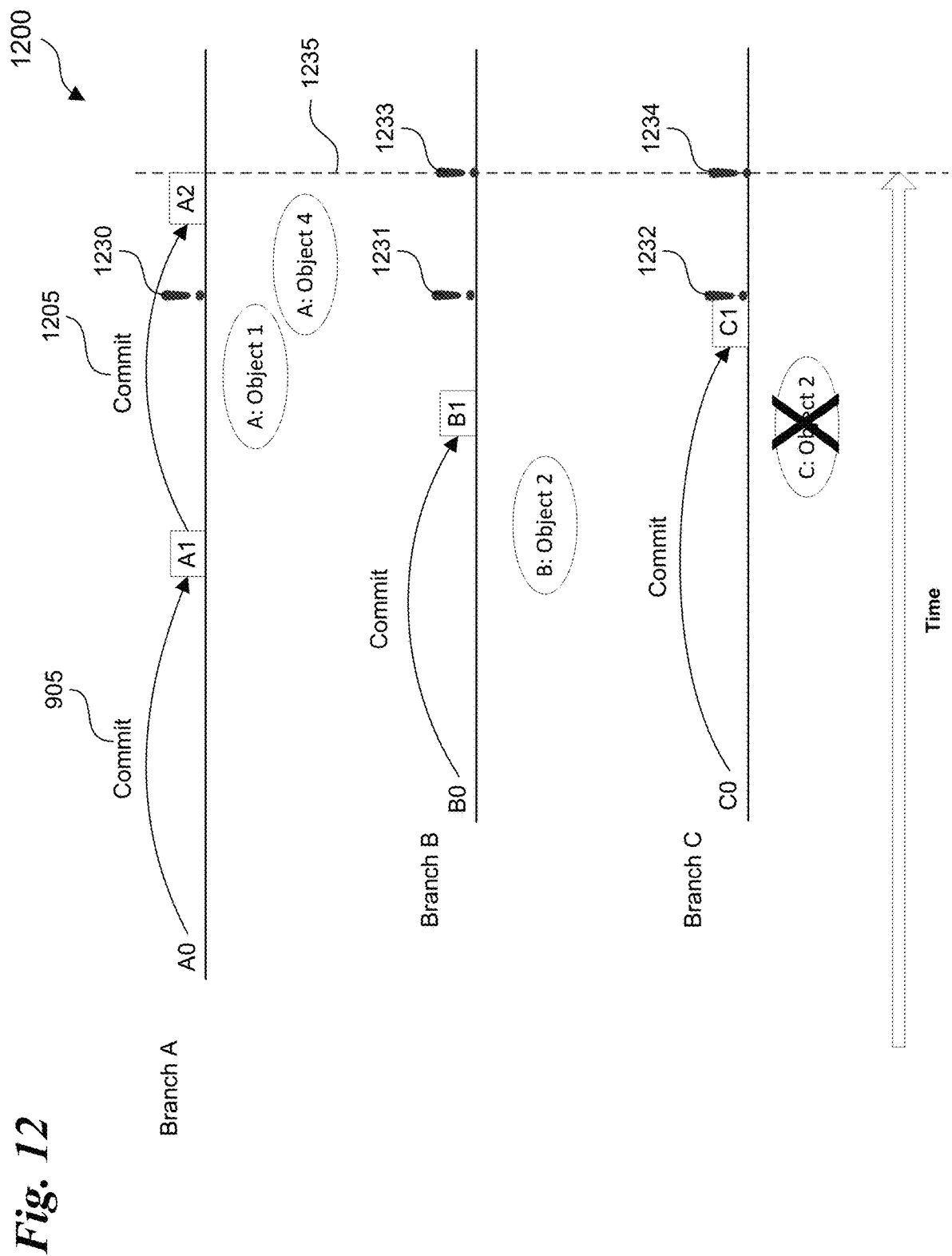
FIG. 12 is a sequence diagram of illustrating additional operations of the version control system shown in FIGS. 8-11.
Figure 13:
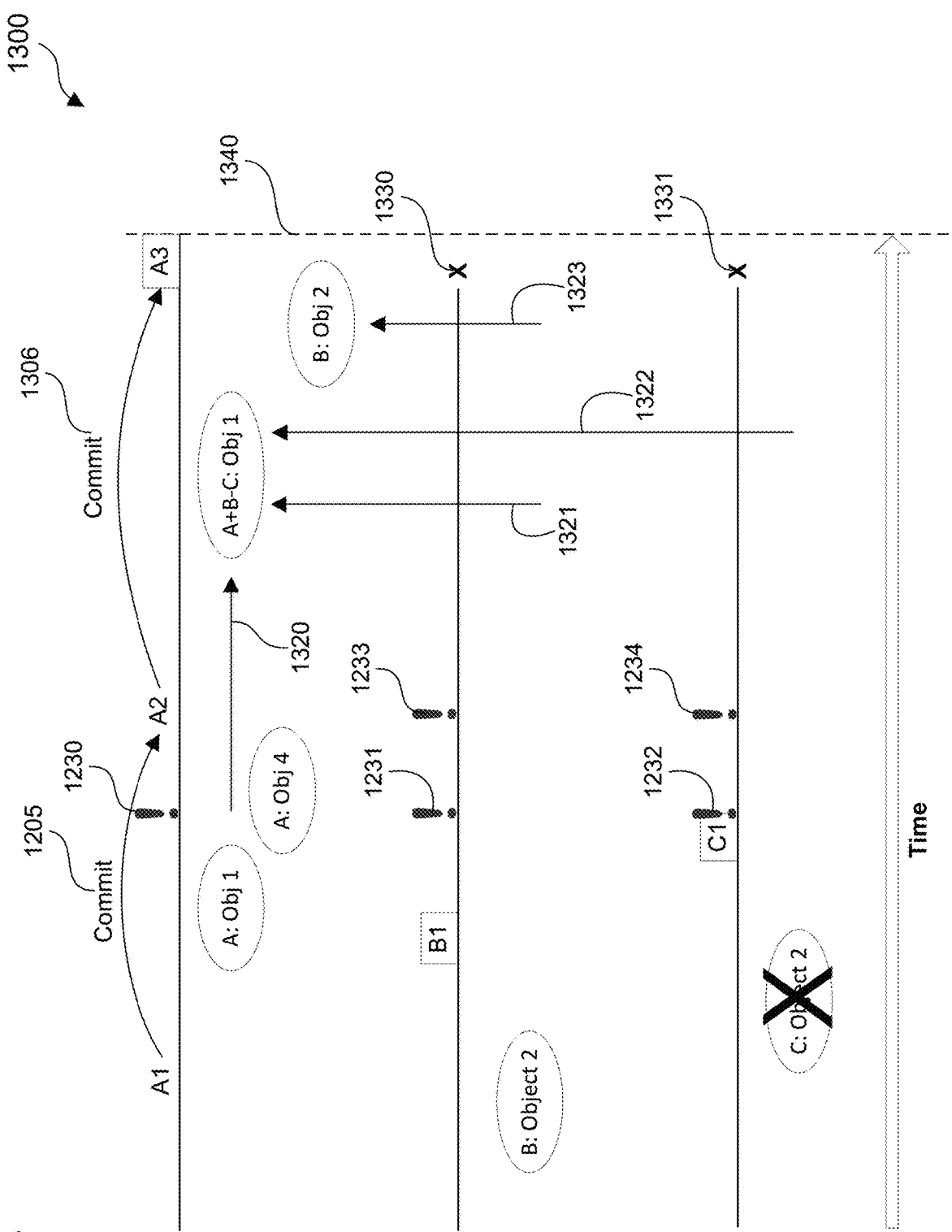
FIG. 13 is a sequence diagram of illustrating additional operations of the version control system shown in FIGS. 8-13.

In another example of the disclosed system in action is illustrated in FIGS. 12 and 13. At 1200, Branches A, B, and C are shown as they appeared after the events of FIGS. 8 and 9. In this example, other conflicts are caused by objects being changed in the parent Branch A, and deleted in a child Branch C. Object 2 in Branch B is modified and the change is committed resulting in a new head revision B1 in Branch B. Shortly thereafter, Object 2 is deleted in Branch C and this change is committed to Branch C resulting in a new head release C1 which removes Object 2. This deletion and commit in Branch C results in three conflict notifications 1230, 1231, and 1232 being raised for Branches A, B, and C respectively.

Notification 1231 is raised in Branch B, and notification 1232 is raised in Branch C to address the issue of a direct conflict caused by the same Object 2 being modified in Branch B, and also deleted later in Branch C. Notification 1230 is raised in Branch A indicating that an indirect conflict exits with Branch C resulting from the deletion of Object 2 from Branch C because Object 1 depends on Object 2, and, incidentally, Object 1 is modified in Branch A (but Object 2 is not).

A second notification 1233 and 1234 may be raised for Branches B and C respectively when a commit to Branch A occurs at 1235 and the changes to Objects 1 and 4 in Branch A are committed to a new head release A2. Notification 1233 may include notification of an indirect conflict between Branches A and B because A includes changes to Object 4, and Object 2 depends on Object 4. A similar notification may be received at 1234 for Branch C as Object 2 is deleted in C, but modified Object 4 in Branch A depends on it.

In this example, rather than resolve the conflicts in Branch B and Branch C before committing to the parent Branch A, all the changes made to the child Branches B and C are collapsed into the parent branch as illustrated in FIG. 13 via one or more conflict resolution and integration operations 1320-1323. Thus the conflict notification 1230 is resolved by collapsing changes from both child branches into the parent branch. However, notifications 1231-1234 are left unresolved as the Branches B and C are left with differing copies of the same objects. In another aspect, Branches B and C may be destroyed at destroy operation 1330 and destroy operation 1331, which may be initiated around the time that commit operation 1306 is executed. Thus, at time 1340, Branch A is the only branch of the illustrated branches remaining, and it contains all of the changes made to all three branches. This is an example of using the disclosed system used to spin off development aspects for a project under version control in separate branches and to then collapse those updates back into the parent branch at the conclusion of the effort, all while being notified of updates occurring in other branches that may affect the result.

As illustrated in the disclosed integration examples, the disclosed version control system may be configured to integrate modifications made in one or more modified branches into a new revision of a third branch of the one or more branches supported by the version control system. In another aspect, the disclosed system automatically determines a conflict for objects of a first branch resulting from changes made to objects of a second branch where the first and second branches of the version control system are different branches with separate copies of the same objects. In another aspect, the system may also update the version information for the objects in the first branch to indicate the nature of the conflict with objects in the second branch, and the version information may include a reference to the respective branch the object is associated with, and as well as data about the changes made to the changed objects in the second branch.

In another aspect of the integration samples, the disclosed version control system may assemble a first change set representing changes made to objects of the first branch, and a second change set representing changes made to objects of the second branch. The system may then integrate the first and second change sets into an integrated change set that includes changes made to objects of the first branch, and changes made to objects of the second branch as disclosed herein elsewhere by following integration rules defining how objects of different types are to be integrated together.

This integration may occur automatically, or with input from users of the different branches involved confirming whether any changes should be integrated, and/or providing input in the integration process such as in the case where two objects have two or three different sets of changes that need to be integrated into the same object. In this situation, manual intervention may be the only way to resolve the conflict. In another example, the union of the changed objects from all branches involved may automatically be created where there is no intersection in the changed objects. This union of objects may automatically be generated and applied to all the branches involved thus providing for an automatic system for updating conflicts that are not direct conflicts.

In all of the examples shown in FIGS. 8-13, and throughout the present disclosure, the disclosed VCS allows users or systems modifying a branch to make those modifications to that branch and commit them without negatively affecting or imposing on other branches. In another aspect, commit operations made to separate branches may be performed as often as seems necessary and without necessarily requiring all conflicts to be resolved before a commit may be performed. Conflicts may be reported and propagated throughout the different branches of the version control system that share a related context so that users, or automated systems using those branches may be notified when objects change, object dependencies change, or other adjustments are made to the objects and/or the overall context that defines them.

Figure 14:
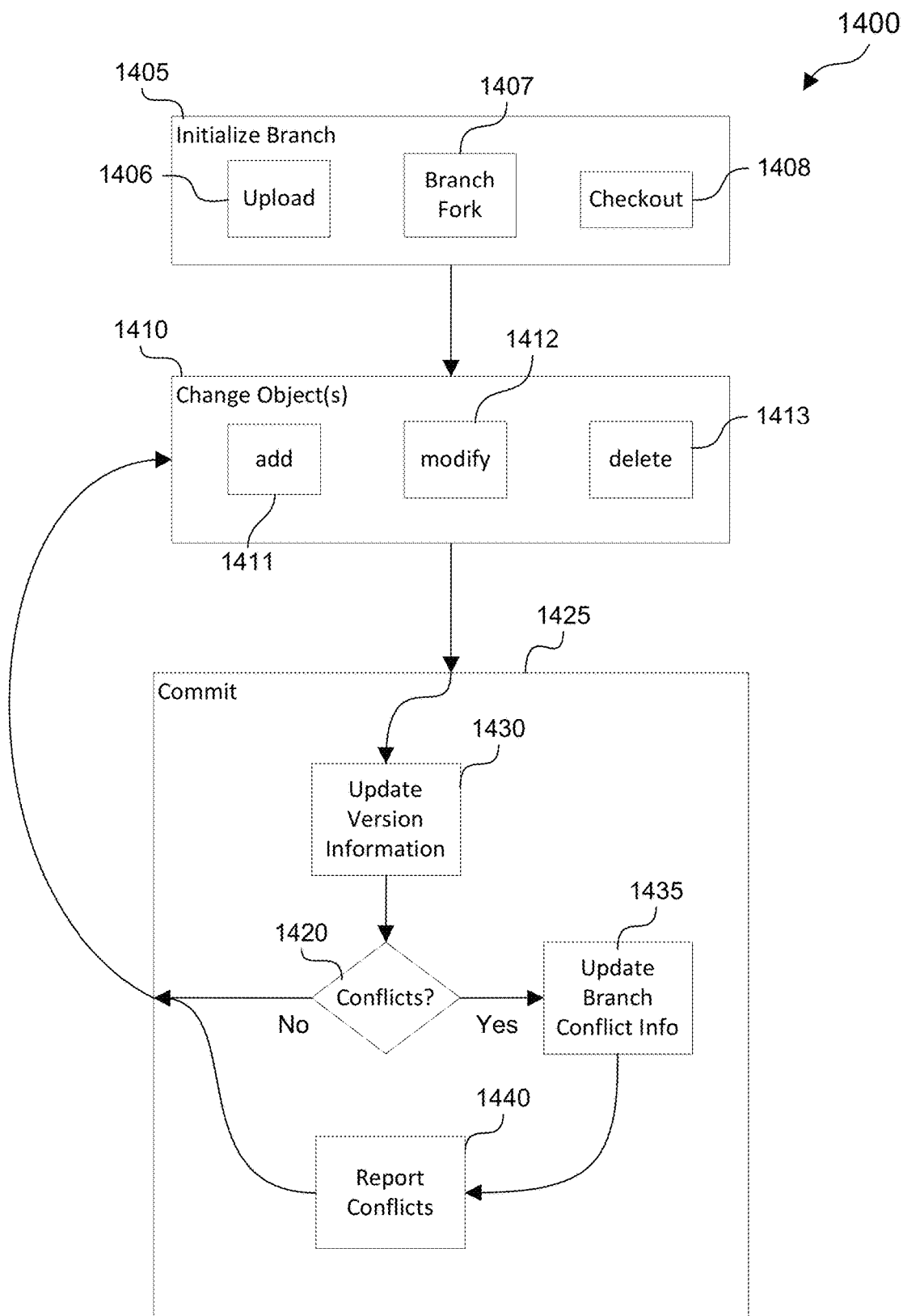
FIG. 14 is a flowchart for the actions that might be taken by a version control system like those shown in the preceding figures.

Illustrated in FIG. 14 is one example of actions the disclosed system may take in automatically determining, and optionally resolving, conflicts related to objects of a first branch that are the result of changes made to objects of the second branch of the version control system. These actions allow the version control system to manage changes in different branches and to update version information for the objects in a first branch to indicate the nature of a conflict with objects in the second branch. As disclosed herein, the version information includes data about the changes made to the objects in the second branch, the first branch or in other branches. The disclosed system may initialize branch 1405 using any suitable method such as by an upload 1406, branch fork 1407, or checkout 1408. An upload operation such as upload 1406 may be used to initially place objects under version control, and thereby initialize a new branch. The branch fork operation 1407 may create a new branch from an existing branch, while a checkout operation 1408 may be used to create a copy of the branch for the purpose of making changes to the objects, such as in the case of initializing a developer or author environment, or for the purpose of preparing a live environment for use. Any suitable approach for initializing a context with at least one branch may be used.

Changes may be made to objects in the branch at change 1410. These include, but are not limited to, an add operation 1411 whereby new objects are created in the branch and may be committed to the branch. In another example, existing objects may be modified at 1412. In another example, an object may be changed by deleting the object at 1413. In this example, the object itself, the object reference, or any combination thereof, may be deleted but record of the object may still exist in the change history for the branch so as to avoid losing track of deleted objects.

A commit operation at 1425 may be performed at any point in the editing process, regardless of whether conflicts exist or whether the updated objects are correct or useful. In another aspect, the user or an automated system may ask the version control system to check conflicts at 1420 without performing commit operation so as to determine whether conflicts exist before a commit is performed. In either case, the system may initiate a conflict check, either before or after updating version information at 1430, for some or all of the objects in the given context at 1420. If conflicts are found, the VCS may determine the type of conflict at 1435 such as whether the conflict is a direct conflict, an indirect conflict, or some other type of conflict.

Conflicts may then be reported at 1440 if any are found thus concluding the commit operation for the given context. The system may then return to processing changes at 1410. In any stage of the process in method 1400, the version control system may notify the user that conflicts exist with objects in the branch caused by changes made to the same or other objects in another branch. Thus at this stage additional changes to the branch may continue and conflicts, where they exist with other branches, will have been reported at 1440.

As illustrated at 1400 the system disclosed herein provides software implementation of a method for automatically updating the version information for objects in one branch to indicate a conflict in response to a commit operation performed another branch. As discussed throughout, objects and the version control system may be files, or may represent files in a file system, and the changes made to the file objects of one branch are representative of changes to the individual files themselves indicated the file has been added, modified, or deleted, to name a few possible examples. Similarly, objects of the other branches may be representative of copies of the same files in another branch, and the version information for those objects may be indicative of changes to separate copies of the files in the other branch indicating that those files have also been added modified or deleted. In another aspect, the system may detect these changes by comparing the unique identifiers of both objects representing separate copies of the same files, and may register a conflict when the IDs for the two objects in the separate branches are equivalent but the state of the objects is different.

Figure 15:
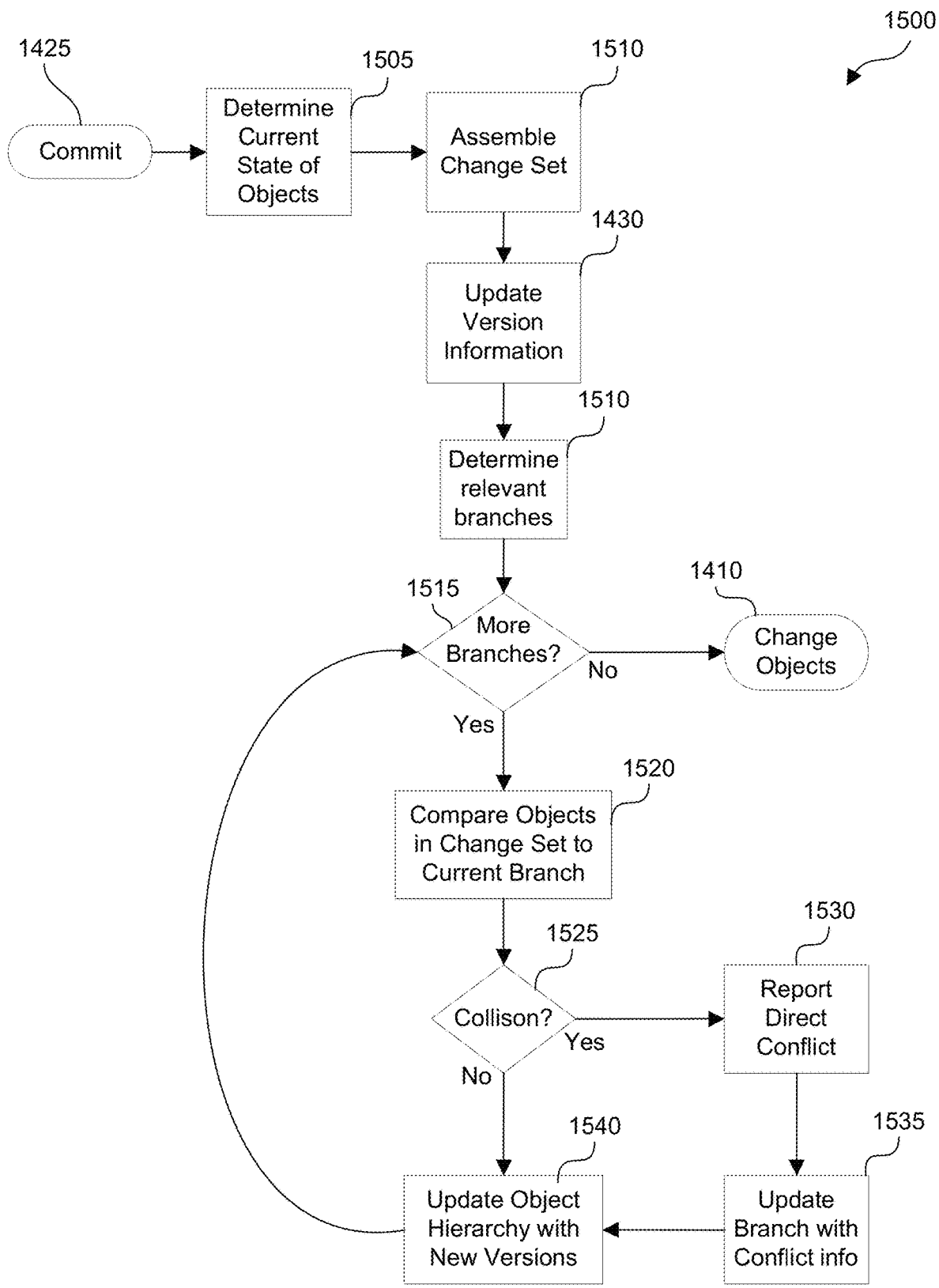
FIG. 15 is a flowchart for the actions that might be taken in determining direct conflicts in a version control system like those shown in the preceding figures.

Illustrated in FIG. 15 is one example of additional actions the disclosed system may take in looking for direct conflicts which may be initiated as part of handling a commit operation such as at 1425 in FIG. 14. In this example, the system may determine the current state of the objects at 1505. This may optionally be implemented by checking for changes made in the current branch, and/or for one or more other branches. The process of determining the current state of objects at 1505 may be implemented as a continuously running sub process or loop that is periodically or continuously comparing objects in one branch against the objects in one or more other branches. In another example, comparing the current state of objects in different branches may occur periodically, such as less than every half second, less than every 30 seconds, less than every 60 seconds, or at a time interval greater than 60 seconds. In another aspect, determining a current state of objects in the current branch may occur simultaneously with the checking of other branches, or in parallel, thus reducing or eliminating additional latency at determine the current state of objects 1505 when the system is working to determine the current state of objects under version control.

Change sets for the current branch may be assembled at 1510 And version information may be updated at 1430. At 1510, a set of relevant branches is determined. This may include recursively traversing parent child relationships between multiple branches starting with the current branch to determine the relevant branches to consider in looking for direct conflicts.

At 1515, the system may iterate over the collection of relevant branches, and compare objects in the change set assembled at 1510 with objects in the current branch to determine if there are any direct conflicts at 1525. For example, the system my compare the changes set from 1510 with the change set reflected in the head release of the current branch. If direct conflicts are present between these two change sets, the direct conflict may be reported at 1530 and the branch or branches involved may have their version information updated to reflect the details of the objects in conflict. If no conflicts are found for the current branch at 1525, an object hierarchy for the branch may be updated to reflect the new version of objects. The system may then complete processing for the current branch, and return to 1515 to consider the next branch, if any remain to process.

As illustrated in FIG. 15 and elsewhere, the disclosed version control system may automatically determine conflicts for objects in at least two separate branches by assembling a first change set representing changes made to object of the first branch, assembling a second change set representing changes made to objects of the second branch, and determining that a conflict is a direct conflict when there is a first change to an object in the first change set, and a second different change to the same object in the second change set. Such a determination may be made by comparing the IDs of the objects and finding a match, while also comparing the state of the objects and finding that the state does not match. This is one example of how the disclosed VCS may recognize and report direct conflicts without interfering with the ability for a user or an automated system to continue to freely make changes as needed. In this way, the system provides knowledge of issues but does not hamper the overall progress toward making updates.

Conflicts may be automatically or manually resolved by assembling a first change set representing changes made to the objects of the first branch, assembling a second change set representing changes made to objects of the second branch, and integrating the first and second change sets into an integrated change set that includes changes made to the first and second branch objects. This conflict resolution and integration may occur according to conflict resolution and integration rules defining how conflicts can be resolved, and how the objects of the same or different types are to be integrated together.

In one aspect, assembling a first change set representing changes made to objects of the first branch may involve database tables. For example, objects of the first branch may include table objects that are associated with the database tables, and changes made to the objects of the first branch may include information about records and/or attributes of the database tables added, modified, or deleted from the database. Similarly, objects of the second branch may include table objects that are associated with separate copies of the same database tables represented by objects of the first branch, and the changes made to the table objects of the second branch may include information about records and attributes of the database tables that have also been added, modified, or deleted. Thus the disclosed system may track changes made to database objects. In another aspect, assembling the first change set may include determining a current state of each database table in the first branch, determining a current state of each database table in the second branch, and determining that a direct conflict is present by comparing the state of database tables in the first branch with the state of corresponding database tables in the second branch. The determination of the state of a database table may be made by one or more queries to determine the state of the data.

Figure 16:
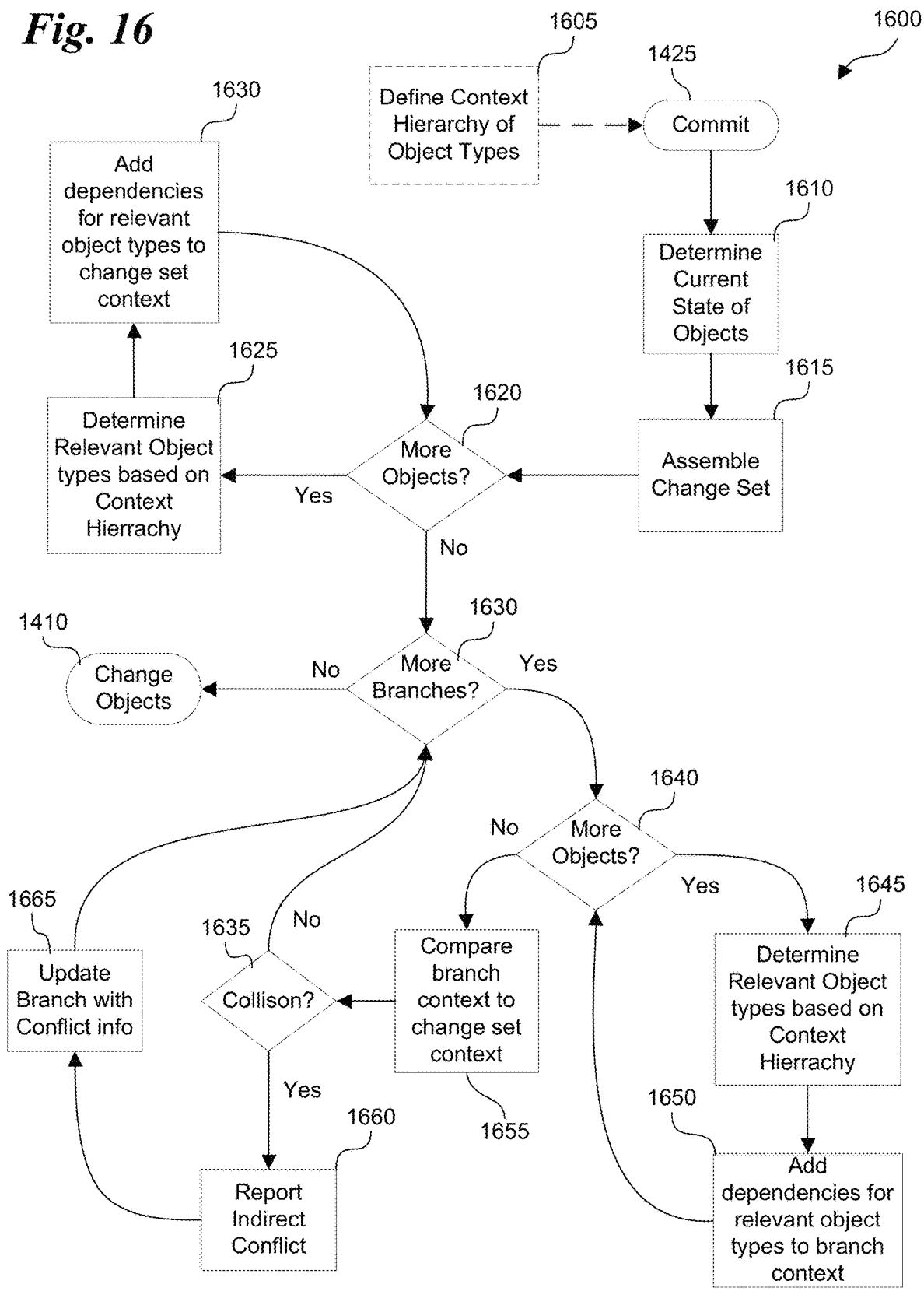
FIG. 16 is a flowchart for the actions that might be taken in determining contextual conflicts in a version control system like those shown in the preceding figures.

Illustration in FIG. 16 is another example of how the system may operate to address indirect conflicts such as those that may become apparent in a commit operation. In the illustrated example, the system may operate to determine changes that have occurred to dependencies of objects in a particular branch as one example of evaluating conflicts arising from changes to the overall context within which objects are considered viable or useful. This may occur in parallel with, before, or after, the actions shown in FIG. 14.

As illustrated in 1600 in FIG. 16, a commit operation may be performed at 1425, which may be preceded by an optional process 1605 whereby a context hierarchy of object types may be defined as discussed herein elsewhere which may be useful for determining indirect conflicts. At 1610, the system may determine the current state of objects, such as the current state of objects in a release of a branch. For example, the system may determine the state of objects in a head release of the current branch. At 1615, the system may assemble a change set and iterate through the objects of this change set at 1620.

For each object in the change set, the system may optionally determine relevant object types based on the context hierarchy defined at 1605. 1630, Dependencies for relevant object types may be added to the current change set context thus building up a collection of object types upon which the current object relies. For example, the system may determine that the current object has dependencies on objects of a particular class such as in the case of an abstract data type. The system may then determine from the context hierarchy that abstract data types of that class include multiple functions, and that these functions include multiple arguments and return types. This example, the system may then add all of these abstract data types, functions, function arguments, and return types to the change set context.

After all objects in the change set from 1615 have been considered at 1620, relevant branches are considered at 1630 these may be the same branches determined at 1510 where the system may recursively traverse the relationships between branches to determine what branches are relevant to the current indirect conflict analysis. For example, branches with a common baseline set of objects, including a parent or child branches may be considered at 1630.

At 1640, objects in the current branch are considered. For example, these objects may be those objects occurring in the change set for the head release of the current branch, or in another example, the objects considered may be all objects under version control for the current branch regardless of change history. At 1645, the relevant object types for the current object are determined based on the context hierarchy of object types for the current branch. This may include or be limited to the context hierarchy defined at 1605. Dependencies for the relevant object types may be included in the branch context and 1650, and processing may then proceed to the next branch until all branches have been considered.

When all objects for the given branch have been considered, the result is a branch context for all objects in that branch that may be then compared to the change set context for the change set assembled at 1615. At 1655 a comparison is made to determine if there any objects in the change set context from 1630 that also appear in the branch context assembled at 1650. If this is the case, an indirect conflict is found at 1635 and reported at 1660, and the branches updated with conflict information 1665. Branch processing them receives to the next branch until the dependency contexts for all branches have been considered compared to change set context. At this point in the process, all indirect conflicts been determined and reported, and regular editing process may continue at 1410.

Figure 17:
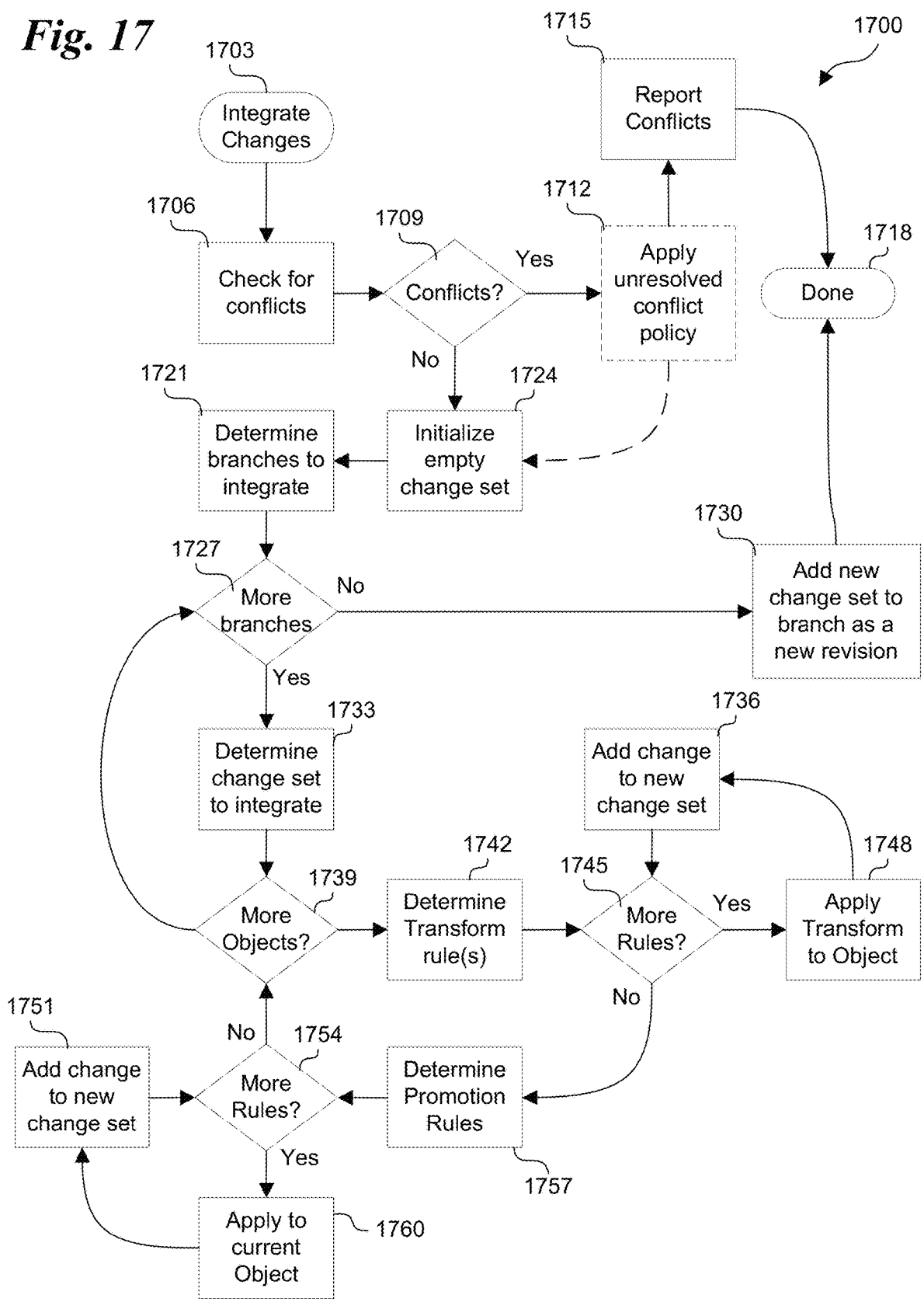
FIG. 17 is a flowchart for the actions that might be taken in resolving conflicts in a version control system like those shown in the preceding figures.

Another example of actions the system may take to integrate changes are illustrated in FIG. 17 at 1700.1703, the system may be configured to integrate changes by checking for conflicts at 1706. Conflicts are found at 1709, the system may optionally apply unresolved conflict policy which may include certain conflicts to be ignored such as conflicts based on ID, conflict type, conflicts state and the like. In this way certain changes may be integrated irrespective of conflicts, and processing may continue to 1724 and the initialization of a new empty change set. Otherwise if the unresolved conflict policy results in no available changes to integrate, conflicts may be reported at 1715 with processing completed at 1718.

There are no conflicts in 1709, or the optional unresolved conflict policy allows for some aspects to be integrated irrespective of conflicts, and empty change set is initialized at 1724. Branches to integrate together are determined in 1721. For example, the system may recursively or iteratively determine all child branches of the current branch and integrate changes from those branches.

The system may then process each of the branches at 1727. Where branches remain to be processed, the change set to integrate is determined at 1733. This may include, for example, they head release of current branch, or all objects in the current branch, in the like. The objects in the change set are considered as 1739 and transformation rules for the current object may be determined 1742. One example, each object may have only one transformation rule, or in another example, multiple transformation rules may apply for a given object. Where there are more transformation rules to consider at 1745, the system may be configured to apply the rule at 1748 to the current object resulting in a transformed object which may then be added to the new change set at 1736. This may continue until there are no more rules to apply to the current object.

The system may optionally determine promotion rules for the current object at 1757, and apply those rules to the current object 1760. Application of the one or more promotion rules may result in installation of the transformed current object into its proper position in the object hierarchy for the branch as specified by the promotion rule. When no further transformation rules are specified for the given object, the next object is considered as 1739 in the application of the transformation and promotion rules continues for all objects in the change set to integrate. When no objects remain to be processed, the next branch may be considered at 1727 and the process repeated starting at 1733 for all objects in the next branch. This may continue until all branches are considered and no further branches remain at 1727. If so, the new change set is added to branch as a new revision at 1730 in the integration process is complete at 1718.

As discussed throughout, the disclosed version control system optionally includes aspects useful for tracking changes not only to the objects themselves, but to the relationships between objects. These relationships may be multi-faceted. For example, as discussed above, the version control system may include object dependencies specific to objects under version control and these object dependencies may define relationships between objects in system, the relationships specifying at least one aspect of one object that is dependent on at least one aspect of another object. In another aspect, the disclosed version control system may include an object model specifying object types for the objects for the version control system, and one or more relationships between the object types. Understanding how the object types relate to on another may be useful in the change tracking process. Examples of how an object model may be arranged in the disclosed VCS are shown in FIGS. 18 and 91.

Figure 18:
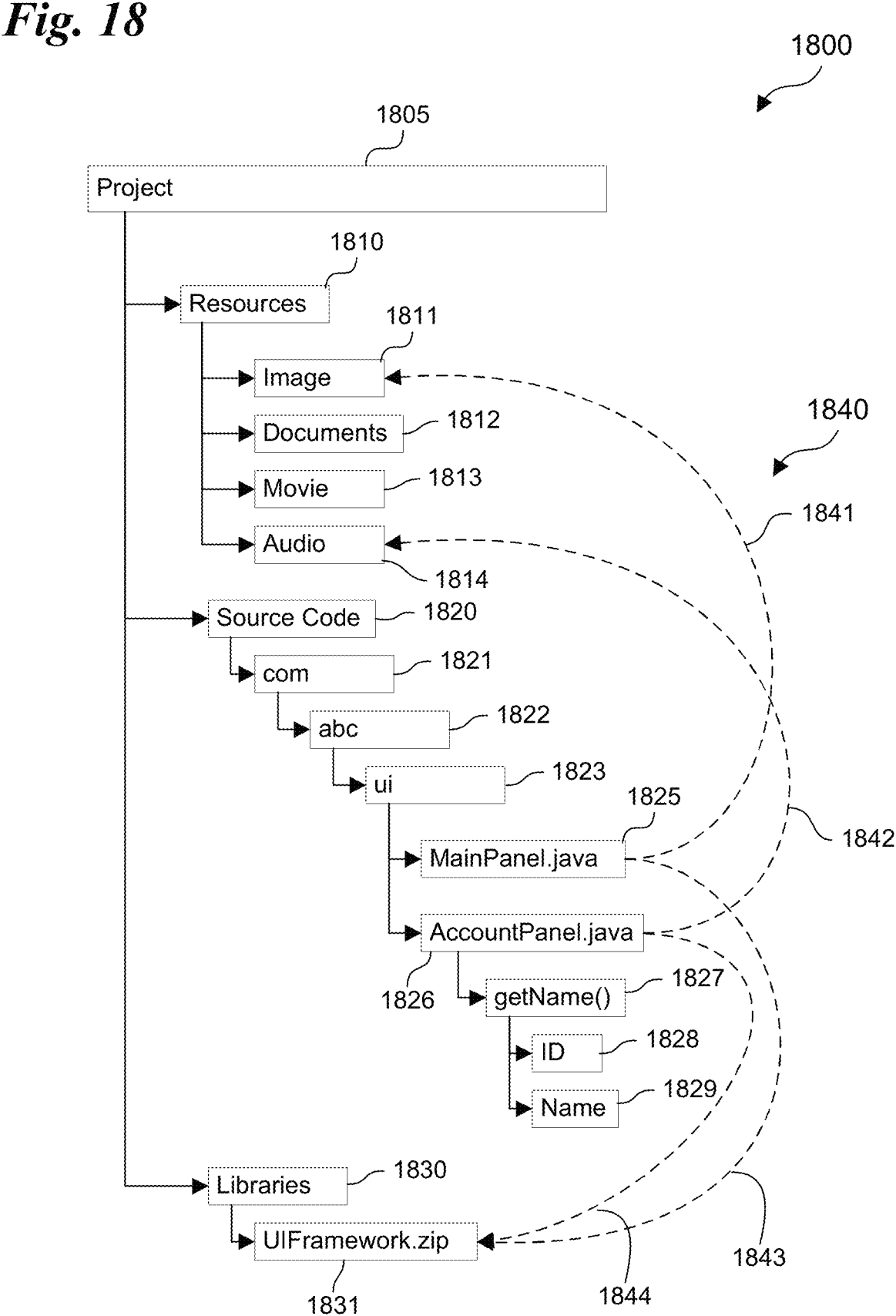
FIG. 18 is a component view of one example of dependencies useful for determining conflicts in a version control system like those shown in the preceding examples.

In FIG. 18, an object model 1800 is shown that, in this example, includes an acyclic directed graph indicating the relationships between objects of different types. For example, a project 1805 as illustrated in FIG. 18 may include resources 1810, source code 1820, libraries 1830, and any other resources that may be related to a project context. The resources 1810 may include images 1811, documents 1812, movies 1813, and audio resources 1814. The source code 1820 may include, for example, packages or libraries and related sub packages such as package 1821, package 1822, and package 1823. These relationships between types of objects may be determined by the VCS and used to determine whether a conflict is present.

The package 1823 may include source code 1825, source code 1826, and others. In the illustrated example, the source code is presented in the Java programming language, but this is only illustrative as the disclosed system may be suitable for source code of any language and may be configured to accommodate any unique organization of code that may be used. The libraries 1830 may include frameworks, libraries, or other foundational collections of classes, objects, resources, and the like that may be used by project 1805, and possibly across multiple projects 1805. The solid line arrows on the left side connecting project 1805 to the various components and subcomponents indicate a hierarchy of object types that can be efficiently traversed by the version control system to determine relationships between objects so that the system can use these relationships to examine how changes made in one object effect other objects in the system. For example, source code 1820 includes a package hierarchy that must be in place in order for source code 1825 and source code 1826 to compile properly. The object model may include a package object type 1823 that refers to an abstract data type object type such as an AccountPanel class 1826. The class type may refer to a method object type 1827, here shown as the getName( ) method. The method object type may refer to a parameter object type 1828, which here is shown as an "ID" parameter that is passed to the getName( ) method. The getName( ) method may include a return type object 1829 which may itself be an object of type "Name", which may include other properties. Thus the hierarchy may specify that the parameter type and return type are included in the method type, and the method type as included in the abstract data type, and the abstract data type as included in the package type.

The object model at 1800 may be useful, for example, in managing dependencies 1840 which are here shown for convenience, but may be implemented and/or maintained in the VCS as a separate data structure different from the object model. Dependencies 1841-1844 may be useful for specifying dependency relationships between objects. For example, source code 1825 may use images 1811 icons or background imagery. The source code 1825 may be fundamentally operable or at least able to compile with or without images 1811, but a runtime error may result if source code 1825 is executed without images 1811. Such an error may only be detectable in testing as discussed above.

In another aspect, library 1831 is included with libraries 1830 as part of project 1805, thus defining a relationship between project 1805 and library 1831. It may also be the case that individual portions of the project may have specific dependencies such as in the case where source code 1825 and source code 1826 may have both compile time, and runtime dependencies on library 1831 as indicated by dependency 1843 and dependency 1844.

Thus library 1831 is part of the context within which source code 1825 and source code 1826 execute. The disclosed version control system may use an object model and/or dependency definitions like those shown in FIG. 18 to capture, maintain, and enforce these relationships so as to alert users, or other automated systems using the VCS that changes to the project have occurred which may create conflicts or problems because of these relationships.

Figure 19:
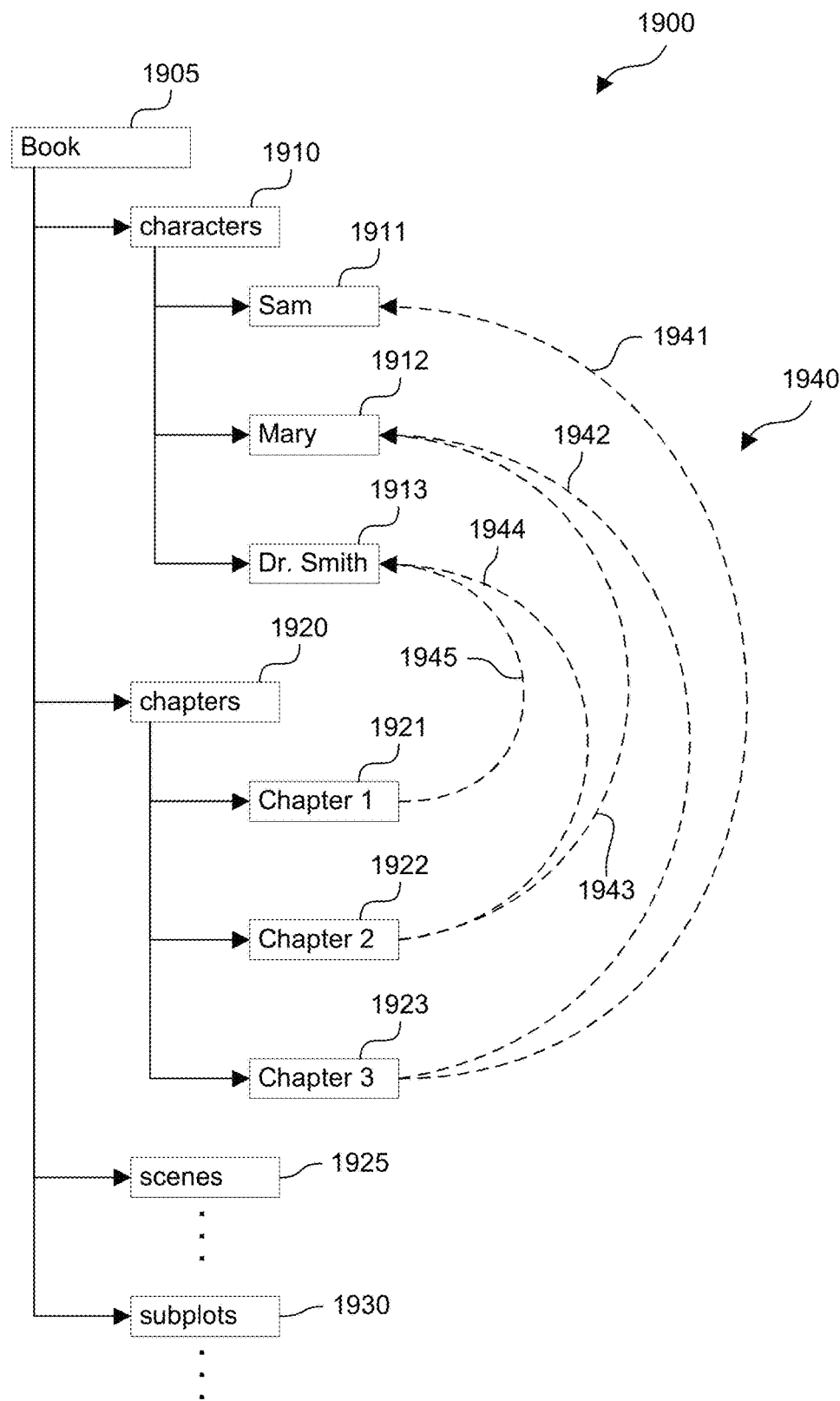
FIG. 19 is a component view of another example of dependencies useful for determining conflicts in a version control system like those shown in the preceding examples.

Another example of an object model and a few related dependencies in the context of a literary work is illustrated in FIG. 19. Whereas FIG. 18 illustrated an example of a software project under version control, FIG. 19 illustrates an example of an object model and some related dependencies that may exist in a project that is related to the authorship of a book. In this example a book 1905 is arranged according to characters 1910, chapters 1920, scenes 1925, and subplots 1930, as well as other elements that may also be included.

These are analogous to object types discussed above and 1905 may be thought of as portions or aspects of the book 1905 to be included in a hierarchical way where it may be said a book "has" characters, chapters, scenes, etc., and characters "include" Sam, Mary, and so forth. In another aspect, dependencies 1940 are shown here although they may be maintained in the VCS separately from the object model. Dependencies 1940 may define relationships between concepts, ideas, topics, places, or other abstract portions of the book 1905 that are necessary in order for the book 1905 to make sense when read.

For example, chapter 1921 may have dependency 1945 on the character 1913 Dr. Smith, which is to say chapter 1 of the book may include references to conversations with Dr. Smith. Thus the version control system may be configured to capture and define both the structural concept of chapters 1920 including a chapter 1921, but also the contextual relationships between chapter 1921 may include elements that are meaningless, or nonsensical, if character 1913 Dr. Smith is not also present. Similarly, chapter 1922 may include a dependency 1944 to character Dr. Smith (1913) as well as references to other characters as specified by dependency 1943. Other examples are shown where chapter 1923 includes dependency 1941 and dependency 1942 to characters 1911 and 1912.

In this aspect, chapter 1923 may include a conversation between character 1911 and character 1912 and thus the VCS may be configured to provide notification of elimination or changes to either of these characters. A first user may be working on book 1905 and may use a first branch to edit characters, chapters, or scenes of the book. In another aspect, other users may also be making changes to book 1905 using other branches. Thus changes to the overall story made in one branch may have an impact on subplots, the relationship between chapters and characters, different scenes or conversations in the book, and the like.

In this example of FIG. 19, one object in the system may be a file, while another object may be a collection of other files with additional information about a topic that is referred to by the text in the first object. The disclosed version control system may automatically detect direct and indirect conflicts between these objects caused by modifications in other branches based on the dependency relationship defined between them. Updates to the version information for the various copies of the objects involved may be automatically disseminated to the various branches to keep the separate authors working on the book aware of changes made by other authors, preferably at about the time those changes occur or are committed to the respective branches.

In another aspect, the disclosed version control system may track specific copies of objects that are checked out into a given branch using a separate collection of changed objects that may track closely with the object model in terms of organization. For example, the collection of changed objects may be maintained by the VCS for a given branch using an acyclical directed graph like those illustrated in preceding examples. In this way, the relationship between the types of objects in the object model, and the changes made to individual copies of objects may be maintained separately but more easily referred to if needed in order to track direct and indirect conflicts.

Figure 20:
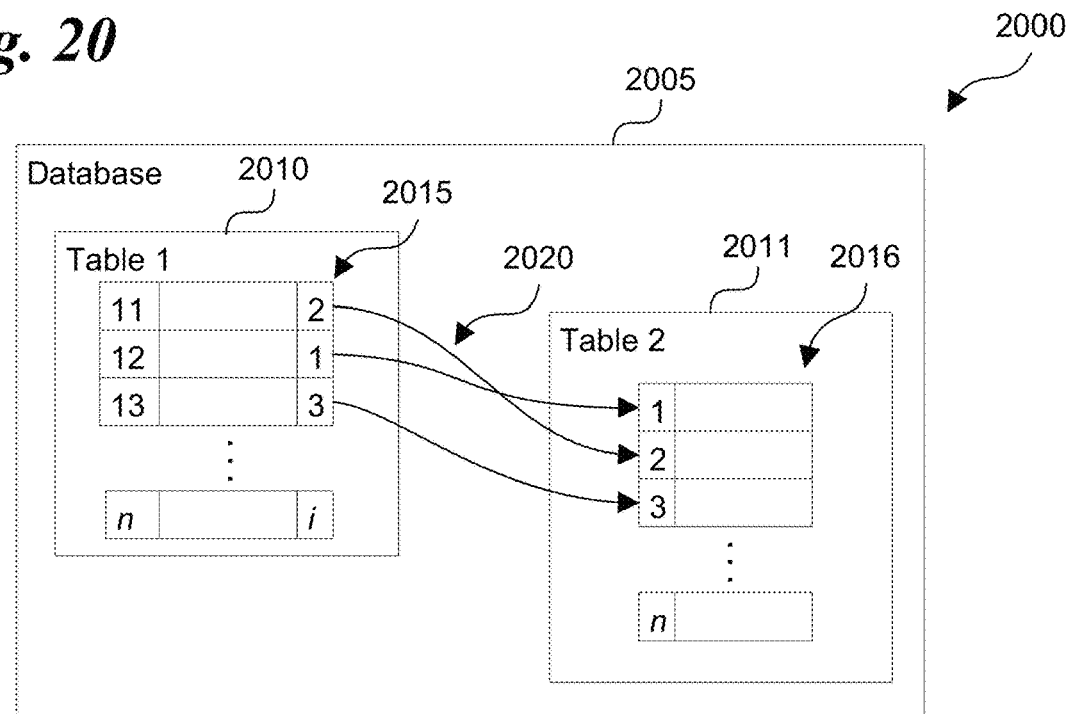
FIG. 20 is a component view of a dependency definition for records in a database useful for determining conflicts in a version control system like those shown in the preceding examples.
Figure 21:
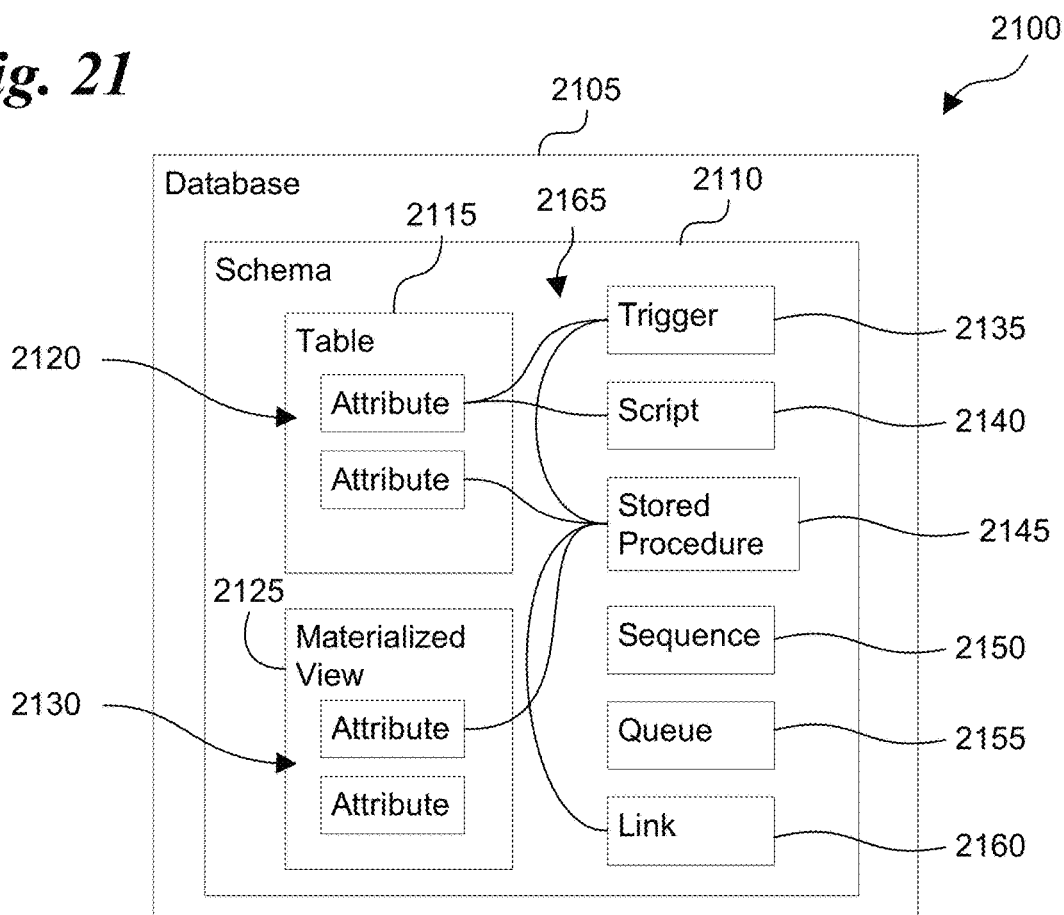
FIG. 21 is a component view of a dependency definition for data structures useful for determining conflicts in a version control system like those shown in the preceding examples.

Another example of a dependency definition is illustrated in FIG. 20 where the disclosed version control system may maintain dependency information about database tables referred to in branches of the version control system. A database 2005 may include a database table 2010 and a database table 2011. The database table 2010 may include records 2015, and database table 2011 may include records 2016. As indicated by key relationships 2020, relationships may be defined between records 2015 and records 2016. These relationships may be configured in and enforced by the database 2005, or they may be configured in and enforced within the source code of a software system that uses database 2005, or any combination thereof. Database 2005 may, for example, require that records 2015 be entered into database table 2010 with values that refer back to records 2016. This requirement may be implemented as a primary key in records 2016 and a foreign key for records 2015 and enforced at runtime by the database 2005 itself. Regardless, the disclosed version control system may optionally maintain dependency information about these relationships so that changes to the records in tables 2010 and 2011 may be checked by the VCS and conflicts recognized and disseminated to other branches as they occur. Thus the VCS can be configured to manage specific data requirements and the changes to those requirements in an organized way to ensure that changes to a system under version control are captured and managed efficiently and effectively.

As illustrated in FIG. 20, the version control system may have a first object that includes a first database table with one or more records, and third object that includes a second database table with one or more records. Records in the second database table may be required to maintain referential integrity for the records in the first database table. In this example, the version control system may integrate with the database to apply version control principles disclosed herein to changes to the values in the records themselves, the structure of the table, modifications of foreign key relationships between tables, or modifications to other aspects of the database. For example, database table 2011 may include configuration data that may be used by a system that relies on database 2005 to operate. Changes to this configuration data may affect the operation of the system and may cause adverse effects if a version of the data is introduced in a live environment that does not match with code executing in the live environment. Thus it may be advantageous to not only manage changes to the relationships between tables in a database, but also to apply the disclosed version control principles and procedures to the data records themselves for some or all of the tables in a database.

In another aspect, the disclosed integration rules defining how objects from a child branch are collapsed into a parent branch, or are collapsed from one branch into another, may be configured in one rule to determine records of one database that have changed in a child branch, while also including a second rule configured to determine records in the second database of change in a parent branch. In another aspect, the integration rules may be configured to transfer records from one database to another to replace corresponding records in the second database where updates are needed to integrate changes made across the different branches. These data transformations may be affected by one or more queries to the database management system, or by any other suitable means as provided for by the specific data repository in use.

In another aspect, the disclosed system may operate to control changes in the database by assembling a first change set representing changes made to records, tables, schemas or other objects of a database in a first branch of the version control system, assembling a second change set representing changes made to corresponding database objects of the second branch and determining a direct conflict is present when there is in intersection in the change sets of modified objects, which is to say there is a first change to an object in the first change set and a second different change to the same object in the second change set.

A similar approach may be taken to determining indirect conflicts as disclosed herein elsewhere where change sets of the dependencies for a given object in one branch are compared to the change set for the dependencies of another copy of the same object in another branch. For example, objects of the first branch may include table objects that are associated with database tables, and the changes made to those objects of the first branch may include information about records and/or attributes of the database tables that have been added, modified, or deleted from database 2005. These modifications may be implemented by one or more queries which may be initiated by the VCS. Objects of the second branch may include table objects that are associated with separate copies of the same database tables represented by objects of the first branch, and the changes made to table objects of the second branch include information about records and/or attributes of the database tables that have been added, modified, or deleted.

Compiling together the change history or change set may include determining a current state of each database table in the first branch, and assembling a second change set that includes determining a current state of each database table in the second branch then determining that a direct conflict is present by comparing the state of the database tables in the first branch with the state of the corresponding database tables in the second branch. If the state is different for two different copies of the same tables, a conflict is noted.

Other aspects of the database that may be managed in a similar way illustrated by the dependency definition 2100. Direct and indirect conflicts may be determined for the relationships as discussed above for FIG. 20, but here they may directed more to structural and operational settings or aspects of the database, and less toward values stored in the database. These additional examples shown and discussed with respect to the database 2105 and may be applicable to all the examples disclosed herein.

Database 2105 may include one or more database schemas 2110 having various aspects such as a database table 2115 having multiple table attributes 2120. Database schema 2110 may optionally include a materialized view 2125 with multiple materialized view attributes 2130 and other optional database structures or features like trigger 2135, script 2140, stored procedure 2145, sequence 2150, queue 2155, and database link 2160. The disclosed version control systems may include dependencies 2165 specifying the relationships between different aspects of the database that may be managed by the version control system. For example, dependencies 2165 may include information about the relationship between stored procedure 2145 which may use trigger 2135, which may in turn may rely on or make updates to table attributes 2120 of database table 2115. Similarly script 2140 may rely on table attributes 2120. These and other relationships may be managed by the version control system disclosed herein to register a direct or indirect conflict when the state of the various database components are in conflict from one branch to another.

Figure 22:
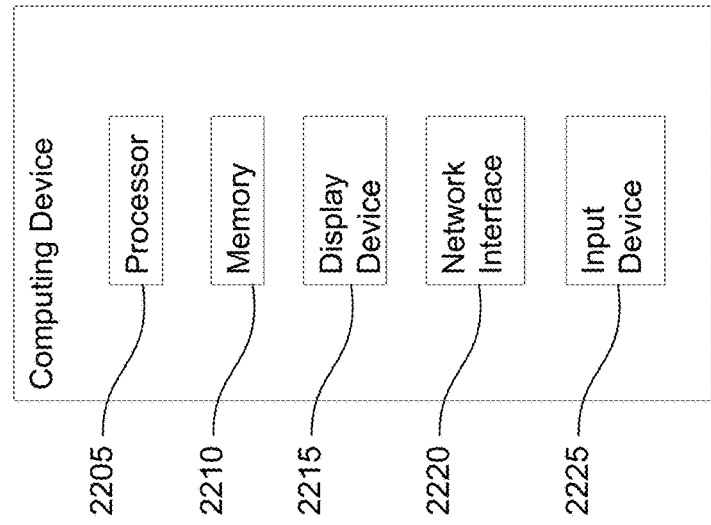
FIG. 22 is a component view of a computing device useful for implementing aspects of a version control system like those shown in the preceding figures.

One example of hardware aspects that may be included in computer or computing device that may be used to execute the version control system disclosed herein are illustrated in FIG. 22 at 2200. Hardware computing device 2200 may be configured according to instructions included in the disclosed software controlling the computer to initialize branches, monitor changes made across branches, notify users of conflicts, automatically resolve conflicts, and any of the other functions disclosed herein.

The computing device 2200 may include a processor 2205 which may be programmed to perform various tasks discussed herein related to version control. Processor 2205 may be coupled to any other aspects of computing device 2200 such as memory 2210, input device 2220, and others. The functions performed by processor 2205 may be configured according to instructions encoded in the disclosed software.

The computing device 2200 may include an input device 2225 which may include hardware and/or related software for managing input and output. These devices may include equipment such as keyboards, mice, touchscreens, microphones, cameras, and the like. The computing device 2200 may be configured to interact with computer networks via communications links disclosed herein to allow computing device 2200 to collaborate with other computing devices. A display device 2215 may be included as well for displaying a user interface generated by computing device 2200. With many tablet, smart phone, smart watch, or desktop personal computing devices, display device 2215 may include a touchscreen making it also an input device.

Figure 23:
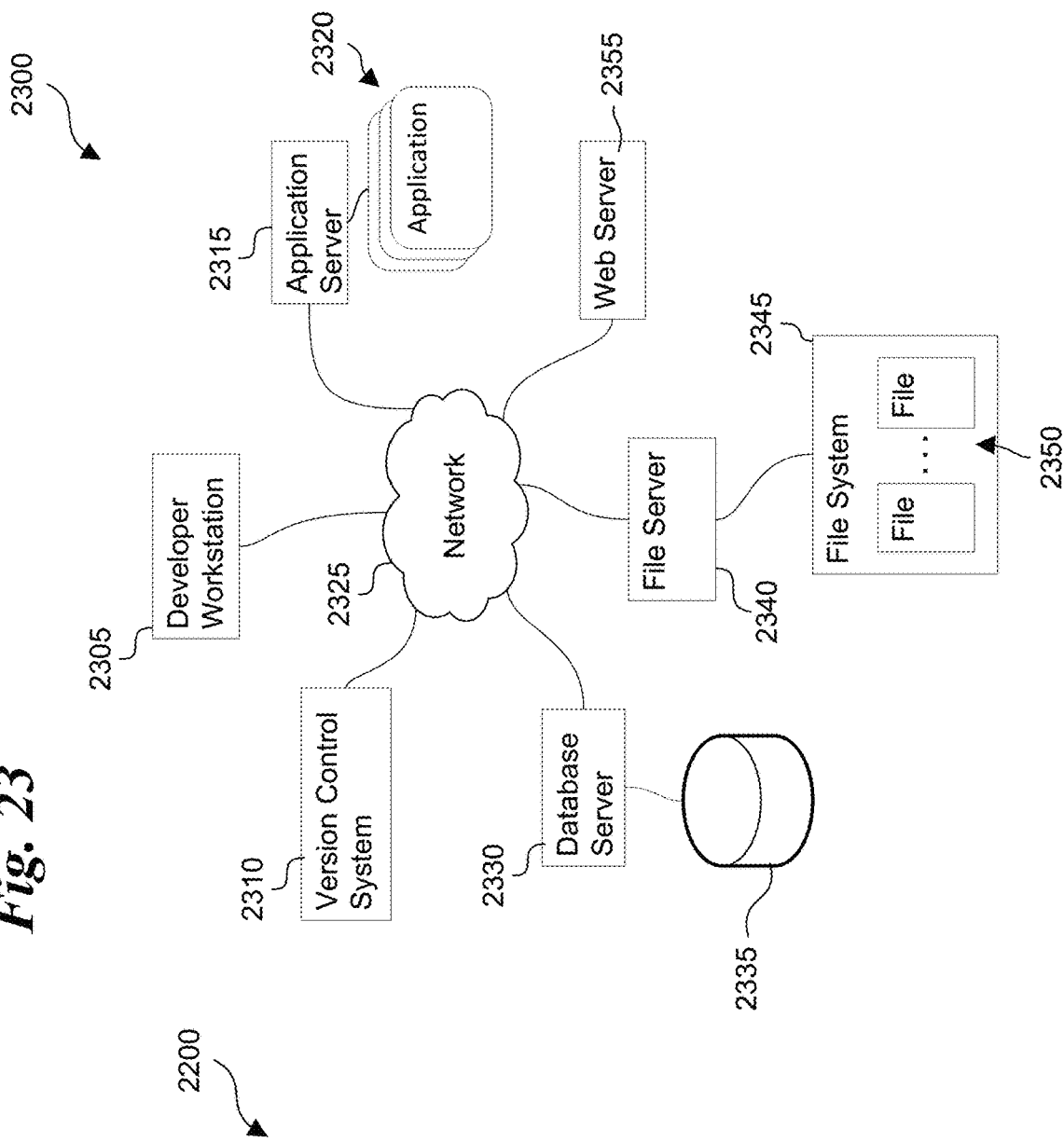
FIG. 23 is a component view of a system architecture useful for implementing aspects of a version control system like those shown in the preceding figures.

One example of a system architecture that may be used in conjunction with the disclosed version control system is illustrated at 2300 in FIG. 23. In this example, the disclosed version control system is implemented in software executing on a computing device (such as computing device 2200 or one like it), or multiple computing devices such as in a virtual environment, where the computing devices individually or collectively include individual or multiple processors programmed to collectively execute the software that provides the functionality and services disclosed herein.

Other aspects of system architecture 2300 that may be included are an application server 2315, a web server 2355, a file server 2340, a database server 2330, and a developer workstation 2305. These may be electrically or electromagnetically coupled together via multiple communication links to a shared network 2325. The network 2325 is illustrated as a central network connecting all of the separate pieces of system architecture 2300 together. However, any suitable network configuration may be used including appropriate placement and operation of firewalls, switches, routers, network taps, hubs, and the like. For example, for increased performance, version control system 2310 and database server 2330 may communicate via communication links that use a separate network known only to version control system 2310 and database server 2330, which may also be linked to network 2325. Such a configuration may be advantageous for high-speed, high-volume, or other important operational parameters for communicating between version control system 2310 and database server 2330. This concept may be applied to any combination of the disclosed architectural elements as needed.

In another aspect, the developer workstation 2305, application server 2315, web server 2355, file server 2340, and database server 2330 may be configured to operate in one or more live environments. In one example, each of the components shown operates in a separate live environment. In another aspect, one or more of the illustrated components may execute together in a single live environment. The relationship between live environments and architectural aspects in system architecture 2300 may be tailored appropriately to the version control related needs of the overall system architecture. In general, any suitable number of architectural components may run in any suitable combination of live environments.

In another aspect, database server 2330 may include a database 2335, or multiple such databases, any of which may be configured to allow the version control system 2310 to manage changes to database 2335 as they occur. In another aspect, file server 2340 may include a file system 2345 with one or more files 2350. Here also, file system 2345 and file server 2340 may be configured to operate in a live environment that is managed by the disclosed version control system represented in FIG. 23 as version control system 2310. In another aspect, application server 2315 includes one or more applications 2320, any combination of which may execute in a live environment managed for version control purposes by version control system 2310.

In another aspect, FIG. 23 is illustrative and not restrictive in that version control system 2310 may be configured to execute on the same physical or virtual server as any of the other listed components shown in system architecture 2300. For example, version control system 2310 may operate as separate server process along with file server 2340 on the same physical hardware thus allowing version control system 2310 and file server 2340 to share the same processor, memory, input devices, and the like. In another example, web server 2355 and file server 2340 may execute on the same physical piece of hardware, or same virtual server platform along with version control system 2310. Any suitable combination of architectural elements illustrated in FIG. 23 may be operated together on the same physical or virtual computing devices.

As disclosed herein elsewhere, portions of version control system 2310 may be included with each of the architectural aspects shown in FIG. 23. For example, an application server plug-in for version control system 2310 may be installed with application server 2315 in order to optimize version control related communications between a physical or virtual server operating application server 2315, and another separate physical or virtual server operating version control system 2310. In this context, a portion of the version control system 2310 may therefore be installed along with or into any of the illustrated architectural components, or in others that may not be illustrated here.

In another aspect, the version control system 2310 communicates to the other servers shown, and to other live nodes operating on these and other servers, via plugins specific to each platform. The system 2310 may integrate the smart VCS features other development operations such as change management, code review, testing, and build management. This integration may be achieved via plug-ins for third party change management, version control, and build automation tools. Thus the disclosed system may provide a library of sophisticated customizable development operations for orchestrating version control across a variety of platforms that may be useful at many stages of the software or project development cycle.

In one example, system 2310 includes a version control server that operates the disclosed system as a web application that may be accessed using graphical user interface generated by the system and displayed, for example, provided by a web browser. This interface may include an interface for administration, process definition, and project or branch management. The version control server may provide a Representational State Transfer API (REST API) for accessing version control functions using custom software applications built for specific integration with other systems, a custom service framework for integration with the third-party development processes that use them, and plugins for integration with development tools to provide notification and execution of version control procedures.

Software modules that may be included in the version control server application include a core module, versioning module, checkout module, commit module, conflict detection and resolution module, administration module, security module, Lightweight Directory Access Protocol (LDAP) module and modules for interacting with other version control and change management systems.

Plugins for supporting VCS functionality for various platforms may also be included with the version control system to allow for integration with other systems. Specific plug-ins include, but are not limited to, webM/SAG, Informatica, IBM, BigData, Oracle, SAP Hana, SQL Server, DB2, Non SQL DB, Couch DB, Sales Force, Docker, Kubernetess, Jira, Service Now, Rally Agile, Azure DevOps, Microsoft TFS, IBM ClearQuest, Service Now, CVS, and Borland Star.

Figure 24:
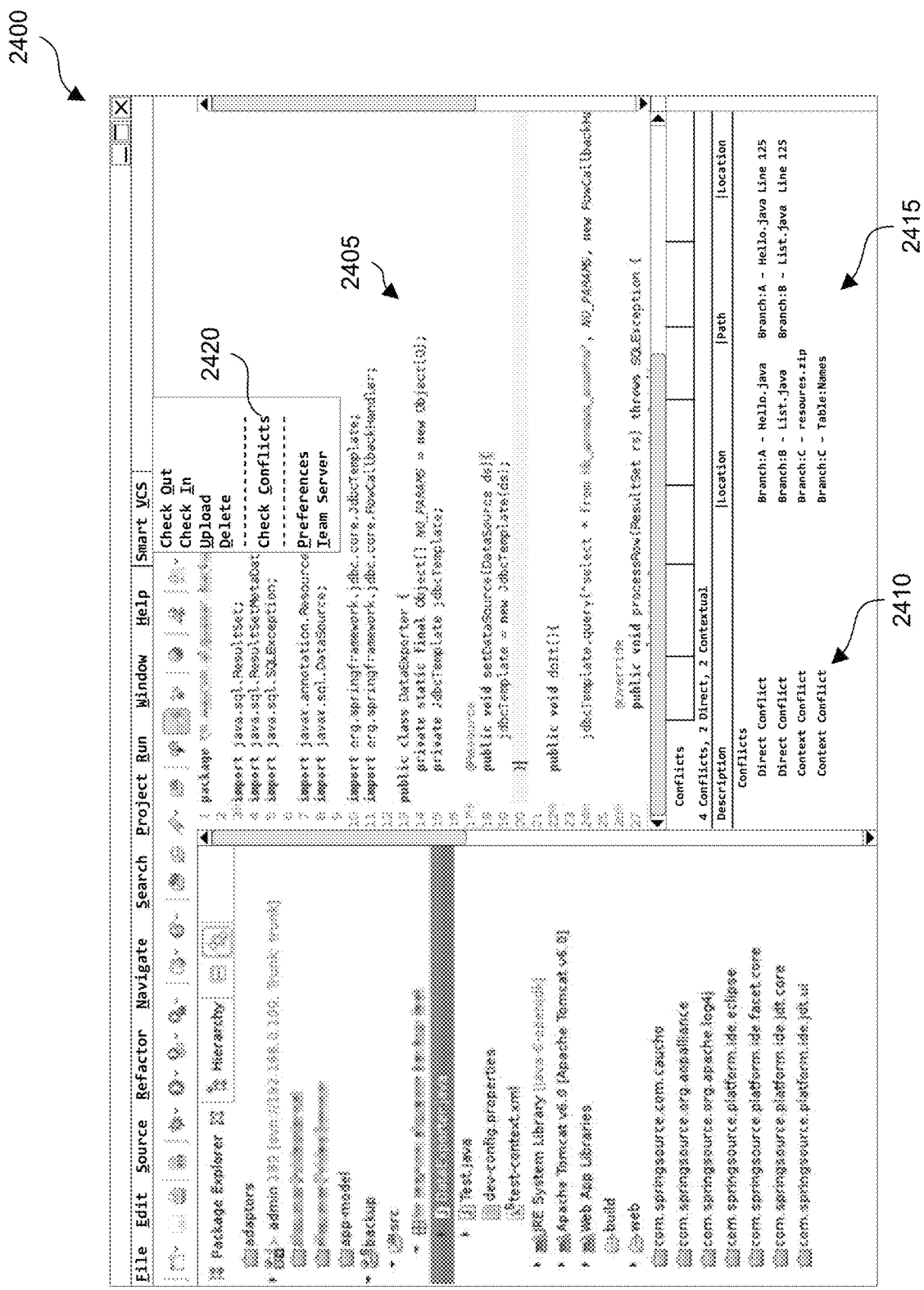
FIG. 24 is a component view of a user interface useful for manually resolving conflicts.

As discussed herein, the disclosed version control system may be configured to automatically detect complex conflicts between separate copies of an object associated with two different branches. This automatic detection capability may be activated upon a commit in any of the branches where changes to objects, or to objects that are dependencies of other objects, may be present. Illustrated in FIG. 24 at user interface 2400 is one example of a user interface that may be configured to display conflict notifications, and to accept input resolving conflicts between objects in the one or more child branches. In this example, user interface 2400 includes an edit window 2405 useful for displaying aspects of objects in a given branch of the VCS. In another aspect, the edit window 2405 includes the contents of a file that is under version control, such as in a branch of the version control system. The edit window 2405 may show the text of the file, or other aspects of the file, and updates to the file may result in conflicts which may appear in window 2410. Information about the conflicts may also be included in user interface 2400, such as in the conflict information region 2415 of the user interface.

In one aspect, conflicts window 2410 and conflict information 2415 may appear when a user commits changes to an object, and there are other branches in the version control system with changes to the same files changed in edit window 2405, or in a related branch have separate copies of the same objects being changed by other input, either user input, or automated input from a software process executing in a live environment. In another aspect, conflicts window 2410 and conflict information 2415 may appear when a "check for conflicts" request is received from user interface 2400. The user interface 2400 may include a user interface control such as a button, menu, or other similar input control, that when activated by a user of the user interface 2400, may result in a request being sent to the version control system to check for conflicts, such as is illustrated at 1425 of FIG. 14. The user interface 2400 may optionally include a check conflict input 2420 accepting input from the user requesting an update on any conflicts with objects in the current branch with respect to other branches in the system.

In another aspect, user interface 2400 may be used to accept user input to integrate changes that were made to copies of objects that were changed in the current branch with copies of the same objects appear in another related branch having the same objects and, in some cases, a common parent. The resulting integrated set of changes to the object my thus include the user input that was helpful in resolving any conflicts between different copies of the same file. In another aspect, the user interface 2400 may provide users with the option to automatically resolve changes that do not involve a direct conflict, like what is illustrated at auto resolve 1530 and auto resolve 1630 in FIGS. 15 and 16 respectively.

The concepts illustrated and disclosed herein related to a version control system may be configured according to any of the following non-limiting numbered examples:

Example 1

A version control system implemented in software and executed by one or more processors of one or more computers, comprising version information associated with one or more objects, the version information including data about changes made to the one or more objects;

one or more branches, wherein the one or more objects are associated with a branch of the one or more branches, and wherein the version information for the one or more objects includes information about the branch the object is associated with;

wherein the version control system is configured to automatically detect a conflict for a first copy of an object associated with a first branch that is the result of changes made to a separate second copy of the object that is associated with a second branch that is different from the first branch; and update the version information for the first copy to indicate the nature of the conflict.

Example 2

The version control system of any preceding example, wherein the version control system is configured to automatically update the version information for the first copy of the object to indicate a conflict when a commit operation is performed on the second branch.

Example 3

The version control system of any preceding example, comprising one or more live environments associated with the one or more separate branches;

wherein modifications to the one or more objects are made in the live environment; and wherein the version information associated with one or more modified objects is automatically updated when changes are made in the live environment.

Example 4

The version control system of any preceding example wherein the live environment includes a running software process that automatically modifies objects in at least one of the multiple live environments as a result of software executed by the running software process; and wherein the version control system updates the version information for the objects which are changed in the live environment.

Example 5

The version control system of any preceding example wherein the live environment includes a native file system;

wherein the changes to the multiple objects include adding, modifying, or deleting files from the respective branch associated with the live environment; and wherein the version control system updates the version information for the objects which are changed in the live environment.

Example 6

The version control system of any preceding example, wherein the version control system is configured to integrate modifications made in one or more modified branches into a new revision of a third branch of the one or more branches.

Example 7

The version control system of any preceding example, wherein the one or more modified branches are child branches of the third branch.

Example 8

The version control system of any preceding example, comprising object dependencies specific to objects of the one or more branches, the object dependencies defining relationships between objects in the branch, the relationships specifying at least one aspect of a first object that is dependent on at least one aspect of a second object.

Example 9

The version control system of any preceding example, wherein at least one branch of the one or more branches comprises a collection of changes made to objects in the branch.

Example 10

The version control system of any preceding example, comprising an object model specifying object types for the objects of the one or more branches and one or more relationships between object types, wherein the collection of changes made to objects in the branch is organized according to the object model.

Example 11

The version control system of any preceding example, comprising an object model specifying object types for the objects of the one or more branches and one or more relationships between object types.

Example 12

The version control system of any preceding example, wherein the object model includes a hierarchy of objects belonging to the model which can be organized as an acyclical directed graph according to the type hierarchy.

Example 13

The version control system of any preceding example, wherein the object model includes a package object type that refers to an abstract data type object type, the abstract data type object type referring to a method object type, the method object type referring to a parameter object type, wherein the hierarchy specifies the parameter type as included in the method type, and the method type as included in the abstract data type, and the abstract data type as included in the package.

Example 14

The version control system of any preceding example, wherein each of the one or more objects comprise an identifier that uniquely identifies each object;
a state value that includes information about a current state of each object.

Example 15

The version control system of any preceding example, configured to automatically compare the state values of revised objects of the one or more objects that are associated with a first branch with state values of objects having the same identifier as the revised object but that are associated with a second branch; and register a direct conflict when the state values do not match.

Example 16

The version control system of any preceding example, wherein first object is associated with a first branch, and the second object is associated with a second branch, and wherein the first and second branches are different branches.

Example 17

The version control system of any preceding example, wherein the first branch and the second branch share a common parent branch that is separate from the first and second branches.

Example 18

The version control system of any preceding example, wherein the version control system is configured to automatically detect an indirect conflict for the first copy of the object in the first branch caused by modifications made to a third object in the second branch, wherein the object in the first branch depends on the third object, and automatically update the version information for the first copy of the object to indicate the indirect conflict when a commit operation is performed on the second branch.

Example 19

The version control system of any preceding example, wherein the first object includes a first object function specified as computer source code; wherein the third object includes a separate third object function that is called by the first object function; and wherein the separate third object function is required in order for the first object function to execute properly.

Example 20

The version control system of any preceding example, wherein the first object is a file containing text about a topic; and wherein the third object is a collection of files with additional information about the topic that is referred to by the text in the first object.

Example 21

The version control system of any preceding example, wherein the first object includes a first database table with one or more records; wherein the third object includes a second database table with one or more records; and wherein the records in the second database table are required to maintain referential integrity for the records in the first database table.

Example 22

The version control system of any preceding example, wherein the third object includes a first database table with one or more attributes; wherein the first object includes a function specified in computer source code that is configured to modify records in the first database table using the one or more attributes.

Example 23

The version control system of any preceding example, wherein the one or more branches include at least one object type defining the type of objects of the one or more objects that can be stored in the individual branches; a live environment to which objects of the individual branches are deployed to or imported from; and at least one integration rule defining a process by which child objects are merged into a parent branch associated with the individual branches.

Example 24

The version control system of any preceding example, wherein a first branch of the one or more branches includes an initial snapshot of the individual objects associated with the branch, the initial snapshot having version information for the individual objects with data about changes made to those objects in the past.

Example 25

The version control system of any preceding example, wherein the version information for the individual objects is held in a child branch that has the first branch as its parent branch, and includes one or more revisions of the individual objects made in the past in the parent branch.

Example 26

The version control system of any preceding example, wherein the initial snapshot of the child branch includes the one or more revisions from the parent branch.

Example 27

The version control system of any preceding example, configured to automatically collapse modifications to objects from one or more child branches into a new revision of a parent branch.

Example 28

The version control system of any preceding example, comprising integration rules defining operations by which objects from a child branch are to be collapsed into the parent branch.

Example 29

The version control system of any preceding example, wherein the version control system is configured to determine modified files of a child branch that are unmodified in a parent branch; and determine modified files of the parent branch that are unmodified in the child branch.

Example 30

The version control system of any preceding example, wherein the version control system is configured to determine records of a first copy of a database that have changed in the child branch; and determine records in a second copy of the database that have changed in a parent branch.

Example 31

The version control system of any preceding example, wherein the version control system is configured to transfer the records from the first database to replace the corresponding records in the second database.

Example 32

The version control system of any preceding example, wherein the version control system is configured to accept input resolving conflicts between objects in the one or more child branches.

Example 33

The version control system of any preceding example, wherein the version control system includes a user interface configured to present information about conflicts between objects in the one or more branches.

The concepts illustrated and disclosed herein related to a disclosed method for performing version control functions may be configured according to any of the following non-limiting numbered examples:

Example 1

A method implemented in software running on one or more processors of one or more computers, comprising automatically determining a conflict for unmodified objects of a first branch of a version control system, wherein the conflict is the result of changes made to objects of a second branch of the version control system, and wherein the first and second branches of the version control system are different branches with separate copies of the same objects; and updating version information for the objects in the first branch to indicate the nature of the conflict with objects in the second branch, wherein the version information includes a reference to the respective branch the object is associated with, and wherein the version information includes data about the changes made to the changed objects in the second branch.

Example 2

The method of any preceding example, comprising automatically updating the version information for objects in the first branch to indicate a conflict in response to a commit operation performed on the second branch.

Example 3

The method of any preceding example, comprising assembling a first change set representing changes made to objects of the first branch; assembling a second change set representing changes made to objects of the second branch; and determining that the conflict is a direct conflict when there is a first change to an object in the first change set, and a second different change to the same object in the second change set.

Example 4

The method of any preceding example, wherein the objects of the first branch include file objects that are associated with individual files, and the changes made to the file objects of the first branch represent changes to the individual files indicating that the file has been added, modified, or deleted; and wherein the objects of the second branch include file objects that are associated with separate copies of the same individual files represented by objects of the first branch, and the changes to the separate copies of the files in the second branch indicate that the file has been added, modified, or deleted.

Example 5

The method of any preceding example, wherein assembling the first change set includes determining a current state of each file in the first branch, wherein assembling the second change set includes determining a current state of each file in the second branch, and wherein determining that a direct conflict is present includes comparing the state of files in the first branch with the state of corresponding files in the second branch.

Example 6

The method of any preceding example, wherein the objects of the first branch include table objects that are associated with database tables, and the changes made to objects of the first branch include information about records and/or attributes of the database tables that have been added, modified, or deleted from the database tables; and wherein the objects of the second branch include table objects that are associated with separate copies of the same database tables represented by objects of the first branch, and the changes made to table objects of the second branch include information about records and/or attributes of the database tables that have been added, modified, or deleted.

Example 7

The method of any preceding example, wherein assembling the first change set includes determining a current state of each database table in the first branch, wherein assembling the second change set includes determining a current state of each database table in the second branch, and wherein the determining that a direct conflict is present includes comparing the state of database tables in the first branch with the state of corresponding database tables in the second branch.

Example 8

The method of any preceding example, assembling first change set dependencies for objects in the first change set, the first change set dependencies representing objects outside the first branch dependent on the objects in the first change set;
assembling second change set dependencies for objects in the second change set, the second change set dependencies representing objects outside the second branch dependent on the objects in the second change set; determining that an indirect conflict may exist for those objects having at least one dependency in both the first and second change set dependencies or for those objects having at least one dependency in the first change set dependency in the second change set.

Example 9

The method of any preceding example, wherein the first change set includes shared libraries; and wherein the second branch includes the objects of the first change set dependencies; and wherein the changes to the shared libraries include information about shared libraries that have been added to, modified in, or deleted from the libraries of the first branch.

Example 10

The method of any preceding example, comprising determining that an indirect conflict is present includes comparing version information associated with the shared libraries of the first branch with the corresponding version information associated with the shared libraries dependencies in the second branch.

Example 11

The method of any preceding example, comprising automatically modifying objects in the second branch using a software process executing on the one or more processors of the one or more computers, wherein the software process is executing in a live environment associated with the second branch.

Example 12

The method of any preceding example, comprising periodically identifying changes made to files in a native file system of the live environment associated with the second branch;
wherein the changes to the objects of the second branch include adding, modifying, or deleting files from the native file system.

Example 13

The method of any preceding example, comprising assembling a first change set representing changes made to objects of the first branch;
assembling a second change set representing changes made to objects of the second branch; and integrating the first and second change sets into an integrated change set that includes changes made to objects of the first branch, and changes made to objects of the second branch;
wherein integrating the first and second change sets is performed according to integration rules defining how objects of different types are to be integrated together.

Example 14

The method of any preceding example, wherein the first branch includes objects that are files, and the changes made to objects of the first branch include information about files that have been added to, modified in, or deleted from the first branch;
wherein the second branch includes copies of the objects from the first branch, and the changes made to objects of the second branch include information about files that have been added to, modified in, or deleted from the files of the second branch; and
wherein the changes made to objects of the first branch are integrated with changes made to objects of the second branch according to a file integration rule specifying that the integrated change set includes files from the first and second change sets while excluding files appearing in both the first and second change sets.

Example 15

The method of any preceding example, comprising accepting user input to address conflicts between copies of the same files appearing in both the first and second change sets.

Glossary of Terms

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Abstract Data Type" generally refers to a software or mathematical construct that defines a data type according to a defined set of possible values (states) and possible operations that may be performed (functions) by or on data of the given type. An abstract data type is generally defined without reference to how the supported operations are to be implemented. It generally does not specify how data will be organized in memory and what algorithms will be used for implementing the operations, rather, it gives an implementation-independent view by defining only the essential function and state and hiding implementation details. Examples of abstract data types include integers and floating point numbers as defined in any programming language that uses them, classes and/or interfaces as defined in the Python, C++, C# Java, and/or Python programming languages, or, a struct as defined in the C programming language.

"Branch" generally refers to is a high-level container for releases and revisions stored as a time series of an initial release and cumulative revisions (modifications to it) stored as change sets. Each branch may have optional properties such as object types, which can be stored in the branch (e.g. Informatica mapplets and its dependents, source code, micro service), a live environment (set of aliases) to which these objects can be deployed or uploaded from, and integration rules with optional additional logic describing how the child objects of different types are merged into the parent branch (see examples below). These properties can be defined for any branch or inherited from the parent branch.

Additionally, a branch may include sets of direct conflicts, which may include conflicting modifications to the same object between the sibling as well as the parent branch, and a set of indirect conflicts, which may include modifications to any object in the child branches with context dependencies that may be dynamically computed for each branch.

Unless otherwise stated, "comparing branches" as used herein generally refers to comparing the head release of two branches. Optionally, the term may also imply computing an initial release stored in either of the branches or in another branch, this branch having all of the branch revisions applied to it.

"Branching" generally refers to the duplication of at least some aspect of an object under version control into a new branch so that modifications can occur in parallel in multiple branches. The originating branch may be referred to as a parent branch, the upstream branch. Child branches are generally branches that have a parent, and a branch without a parent is commonly referred to as the trunk or the mainline. Branching also generally implies the ability to later merge or integrate changes back onto the parent branch, or to merge sibling branches together. Often the changes are merged back to the trunk, even if this is not the parent branch. A branch not intended to be merged is sometimes referred to as a "fork" or as a "hard fork".

"Branch Head" generally refers to the latest release in the branch calculated by applying all of the changes to the initial release.

"Checkout" or "Deploy" generally refers to the operation of porting, deploying, and activating a deployable image for any release R onto a live node.

"Conflict Detection" or "Collision Detection" generally refers to a process by which branch conflicts (i.e. collisions) are determined. In one example, the process includes traversing the branch graph to find objects in the branch that are also in the revision under review.

"Commit" or "check-in" generally refers to the process of preparing and storing a change set to a branch and as a new revision, which can incorporate these changes into the head release of the branch or create and store a new head release. This may be performed based on changes made to objects in a branch, for example by integration or direct modification, or by synchronizing the state of a live node with a branch during which the branch is updated with a new revision that includes changes that have been made in the live environment.

"Communication Link" generally refers to a connection between two or more communicating entities for the purposes of passing information between the entities. The communication between the communicating entities may occur by any suitable means. For example the connection may be implemented as a physical link, an electrical link, an electromagnetic link, a logical link, or any other suitable linkage facilitating communication.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

"Computer" or "Computing Device" generally refers to a device configured to compute a result based on input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Computer software", or "Software" is an organized collection of bits representing computer instructions and data that tell the computer how to perform a series of actions. This is in contrast to physical hardware which is configured to actually perform the steps specified in the software. Examples include computer programs, libraries and related non-executable data, such as online documentation or digital media. Software includes processor specific instructions usually expressed as bits of binary data values signifying processor instructions that change the state of the computer from its preceding state. For example, an instruction may change the value stored in a particular storage location in the computer—an effect that is not directly observable to the user. An instruction may also invoke one of many input or output operations, for example displaying some text on a computer screen; causing state changes which should be visible to the user. The processor executes the instructions in the order they are provided, unless it is instructed to "jump" to a different instruction, or is interrupted by the operating system. As of 2015, most personal computers, smartphone devices and servers have processors with multiple execution units or multiple processors performing computation together, and computing has become a much more concurrent activity than in the past.

The majority of software is written in high-level programming languages. They are easier and more efficient for programmers because they are closer to natural languages than machine languages. High-level languages are translated into machine language using a compiler or an interpreter or a combination of the two. Software may also be written in a low-level assembly language, which has strong correspondence to the computer's machine language instructions and is translated into machine language using an assembler.

"Conflict" generally refers to a condition caused by an update of a state of an object to a new value, such that it prevents that object's integration with other copies of the same object, or objects that depend on it.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of floors in a house.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (DBCP), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Dependency" generally refers to a referential relationship between objects.

"Dependency Function" generally refers to a function executed by a processor on a branch that evaluates the dependencies for a given object and returns the set of all objects that depend on the object. The set may be empty where an object has no other objects depend on it.

"Deployable Image" generally refers to a consistent set of objects prepared for introduction into a live environment that includes the objects the live environment needs to execute along with any dependencies that may not be in the live environment and can be installed.

To compute a deployable image for a set of objects S: $\{c_0 \ldots c_N\}$ and a live node LN the following exemplary procedure may be used:
1. For each element $c_k$ in the set S calculate the set of dependencies $D(c_k)=D$: $\{c\text{-uid}_0 \ldots c\text{-uid}_N\}$
2. If D is not null, for each element c-uid$_j$ in D:
   if it's already in the original set S or on LN, we go to the next element in D
   otherwise: search the object graph for an object with an identifier that matches c-uid$_j$ and set d$_j$=the result of this search
   if d$_j$ is not null, it's added to the set S, and this procedure is repeated for dependencies of this object d$_j$
   else if d$_j$ is null, it does not exist in the object graph, and therefore cannot be resolved. Exit with an appropriate "unresolved dependency" error.

"Direct Conflict" or "Direct Collision" generally refers to a situation where two revisions in different branches contain the same object in different states.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback (or a suitable replacement therefor such as in the case of a blind person) to a user using a system. Display devices may also include a "check engine" light, a "low altitude" warning light, an array of red, yellow, and green indicators configured to indicate a temperature range to name a few additional non-limiting examples.

"File" generally refers to a separately identifiable collection of bits for recording data discretely in a computer memory or other computer storage device. A file may include meta data or attributes of the file providing information about the file such as a name, size, type of file, and the like. Other meta data includes information about the computer or computer application that created the file, the date and time it was created, the date and time it was last modified, what application should be used to read it, whether it is encrypted or encoded according to a particular encryption or encoding scheme, and others. Thus the bits of a file may be designed to store a picture, a written message, a video, a computer program, or a wide variety of other kinds of information. Some types of files can store several types of information at once.

By using computer programs, a person can open, read, change, save, and close a file. Computer files may be reopened, modified, and copied an arbitrary number of times, and are generally defined within the context of a file system.

"File System" generally refers to a computer implemented method of organizing and retrieving files from an electronic storage device. This functionality is often integrated into operating system software because a file system works closely with the physical storage media in a computing device to organize the bytes of a file on the physical media so that files can be organized, searched, opened, closed, etc.

A file system may be limited to a single physical storage device, or may be configured to make use of the physical storage media for multiple storage devices, some of which may be in the same physical computer with a processor that is executing the file system software or operating system that includes it, and others of which may be store remotely and accessed via a computer network.

"Indirect Conflict" or "Indirect Collision" for a given object generally refers to a conflict resulting from changes to another object the given object depends on. This dependency may be defined in any suitable manner, such as by a hierarchy of objects indicating relationships between objects or relevant aspects of objects, and defining parent/child relationships that may be enforced so as to alert authors that objects in the VCS are in an inconsistent state. One example of an indirect conflict is where a change is made to an object that the given object depends on that is in a different branch and is in an untested state.

"Input Device" generally refers to a device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Intersection Detection" or "Indirect Conflict Detection" generally refers to a process by which implicit branch conflicts (or indirect conflicts) are determined. In one example, the process includes and done in parallel with the direct conflict detection. The procedure I(r) can be defined as follows:
1. Let $CL_b$ be a set of modified objects in a branch b.
2. Calculate the dependency set $D_r^j(c_j)=\{c_0 \ldots c_N\}$ for each $c_j$ in $CL_b$ contained in r.
3. Compute $D_r=\cup\{D_j-D_j\cup r\}$ for all j from 1 to N, which is a set of objects in the release r that are not part of the branch and depend on the release content
4. At each traversal of the graph for direct collision detection, (in parallel) compute the intersections between $D_b$ and r at every branch b to form the implicit conflicts for r.

"Live Environment" or "Live Node" generally refers to an operating environment objects may be deployed to for operation or execution. Examples include different types of computing devices such as application servers, file servers, database servers, application servers and the like that are configured to receive a collection of objects deployed for execution or to be operated on by other processes.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change memory (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other nonvolatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Metadata" generally refers to a set of data that describes and gives information about other things or other data.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include the application layer, transport layer, internet layer (including, e.g., IPv6), or link layer.

"Object" or "Project Constituent" generally refers to a separately identifiable collection of bytes, structured or unstructured, that are under version control as a unit. An object or project constituent may include a unique identifier, and a state, and may be associated with a concept that has meaning in a separate domain specific context such as in the case of a Java class file, an Oracle database table, a MPEG2 encoded video file, an XML file, or other organized collection of information that is domain specific.

"Plug-in", or "add-in", or "add-on", is a software component that may be combined with an existing host software program to provide customized functionality to the host software. The host program is commonly a stand-alone executable program, while the plug-in or add on typically is not. Plug-in enabled software provides a framework by which other software developers can produce customized integration code allowing an existing software tool to communicate with or integrate into another existing software tool without requiring a complete rebuild of either tool.

The host application may provide services which the plug-in can use, including a way for plug-ins to register themselves with the host application and a protocol for the exchange of data with plug-ins. Plug-ins depend on the services provided by the host application. Conversely, the host application operates independently of the plug-ins, making it possible for end-users to add and update plug-ins dynamically without needing to make changes to the host application. Plug-in functionality is typically made available using shared libraries, which may be dynamically loaded at run time, and installed in a place prescribed by the host application.

"Process" generally refers to an instance of a computer program that is being executed by one or many threads in a computer processor. It contains the program code and its activity. Depending on the operating system (OS), a process may be made up of multiple threads of execution that execute instructions concurrently.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in non-volatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Record" generally refers to a related collection of fields containing data. The fields of a record may also be called members, attributes, or elements. For example, a date could be stored as a record containing a numeric year field, a month field represented as a string, and a numeric day-of-month field. A personnel record might contain a name, a salary, and a rank. A Circle record might contain a center and a radius—in this instance, the center itself might be represented as a point record containing x and y coordinates.

Records are distinguished from arrays by the fact that their number of fields is typically fixed, each field has a name, and that each field may have a different type.

Records can exist in any volatile or nonvolatile computer storage medium, including main memory and mass storage devices such as magnetic tapes or hard disks. Records are a fundamental component of most data structures, especially linked data structures. Many computer files are organized as arrays of logical records, often grouped into larger physical records or blocks for efficiency.

The parameters of a function or procedure can often be viewed as the fields of a record variable; and the arguments passed to that function can be viewed as a record value that gets assigned to that variable at the time of the call. Also, in the call stack that is often used to implement procedure calls, each entry is an activation record or call frame, containing the procedure parameters and local variables, the return address, and other internal fields.

An object in object-oriented language is essentially a record that contains procedures specialized to handle that record; and object types are an elaboration of record types. Indeed, in most object-oriented languages, records are just special cases of objects, and are known as plain old data structures (PODSs), to contrast with objects that use OO features.

A record can be viewed as the computer analog of a mathematical tuple, although a tuple may or may not be considered a record, and vice versa, depending on conventions and the specific programming language. In the same vein, a record type can be viewed as the computer language analog of the Cartesian product of two or more mathematical sets, or the implementation of an abstract product type in a specific language.

"Release" generally refers to a snapshot of the state of a set of objects in a version control system.

"Revision" generally refers to a release equivalent to a change set between two releases.

"Root Branch" generally refers to a top-level branch whose releases contain all of the objects for a project.

"Rule" generally refers to a conditional statement with at least two outcomes. A rule may be compared to available data, which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if (clouds.areGrey( ) and
    (clouds.numberOfClouds > 100) ) then {
        prepare for rain;
} else {
        Prepare for sunshine;
}
```

"State" generally refers to the particular condition that someone or something is in at a specific time.

"Type" generally refers to an identifier that may be applied to concepts, abstractions, or physical things having common characteristics. Examples include types of data such as "text", "numbers", or "audio" data. The concept may be applied to any concept such as types of vehicles, types of numbers, types of people, and the like. Applying a "type" to related things provides context and organization, and is useful in the computing context to ease the burden of sorting, searching, and storing different aspects of a system for more efficient and effective processing.

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Upload" generally refers to an initial import of an object into a version control system.

"User Interface" generally refers an aspect of a device or computer program that provides a means by which the user and a device or computer program interact, in particular by coordinating the use of input devices and software. A user interface may be said to be "graphical" in nature in that the device or software executing on the computer may present images, text, graphics, and the like using a display device to present output meaningful to the user, and accept input from the user in conjunction with the graphical display of the output.

What is claimed is:

1. A version control system, comprising:
   one or more processors of one or more computers executing at least one running version control process;
   version information associated with one or more objects, wherein the version information includes change data about changes made to the one or more objects, and wherein the change data is automatically updated by the at least one running version control process;
   one or more branches, wherein the one or more objects are associated with a branch of the one or more branches, and wherein the version information for the one or more objects includes information about the branch the object is associated with;
   wherein the at least one running version control process is responsive to changes made to the one or more objects in the one or more branches;
   wherein the at least one running version control process is configured to automatically determine a conflict exists for a first unmodified copy of an object associated with a first branch of the one or more branches before an integration operation is performed in the first branch, wherein the conflict is the result of modifications made to a second copy of the object in a second branch of the one or more branches;
   wherein the at least one running version control process is configured to update the change data for the second copy of the object and the version information for the first unmodified copy of the object to indicate a conflict exists in the first branch and the nature of the conflict;
   one or more change sets, wherein the one or more change sets define a first change set and a second change set, wherein the first change set represents changes made to objects of the first branch, wherein the second change set represents changes made to objects of the second branch, wherein the first change set includes one or more dependencies representing objects outside the first branch dependent on the objects in the first change set, and wherein the second change set includes one or more dependencies representing objects outside the second branch dependent on the objects in the second change set;

wherein the at least one running version control process is configured to determine a direct conflict exists when there is a first change to an object in the first change set, and a second different change to the same object in the second change set; and, wherein the at least one running version control process is configured to determine an indirect conflict exists for objects having at least one dependency in both the first and second change set dependencies.

2. The version control system of claim 1, wherein the version control system is configured to automatically update the version information for the first copy of the object to indicate a conflict.

3. The version control system of claim 1, comprising:
one or more live environments associated with the one or more separate branches;
wherein modifications to the one or more objects are made in the live environment; and
wherein the version information associated with one or more modified objects is automatically updated when changes are made in the live environment.

4. The version control system of claim 1, wherein the version control system is configured to integrate modifications made in one or more modified branches into a new revision of a third branch of the one or more branches.

5. The version control system of claim 4, wherein the one or more modified branches are child branches of the third branch.

6. The version control system of claim 1, comprising:
object dependencies specific to objects of the one or more branches, the object dependencies defining relationships between objects, the relationships specifying at least one aspect of a first object that is dependent on at least one aspect of a second object.

7. The version control system of claim 1, wherein at least one branch of the one or more branches comprises:
a collection of changes made to objects in the at least one branch.

8. The version control system of claim 1, comprising:
an object model specifying object types for the objects of the one or more branches and one or more relationships between object types;
wherein the collection of changes made to objects in the branch are mapped to the object model.

9. The version control system of claim 1, comprising:
an object model specifying object types for the objects of the one or more branches and one or more relationships between object types.

10. The version control system of claim 9, wherein the object model includes a hierarchy of objects organized as an acyclical directed graph, the graph representing parent-child relationships between the objects.

11. The version control system of claim 10, wherein the object model includes a package object type that refers to an abstract data type object type, the abstract data type object type referring to a method object type, the method object type referring to a parameter object type, wherein the hierarchy specifies the parameter type as included in the method type, and the method type as included in the abstract data type, and the abstract data type as included in the package.

12. The version control system of claim 1, wherein each of the one or more objects comprise:
an identifier that uniquely identifies each object;
a state value that includes information about a current state of each object.

13. The version control system of claim 12, configured to automatically:
compare the state values of revised objects of the one or more objects that are associated with a first branch with state values of objects having the same identifier as the revised object but that are associated with a second branch; and
register a direct conflict when the state values do not match.

14. The version control system of claim 13, wherein first object is associated with a first branch, and the second object is associated with a second branch, and wherein the first and second branches are different branches.

15. The version control system of claim 14, wherein the first branch and the second branch share a common parent branch that is separate from the first and second branches.

16. The version control system of claim 1, wherein the version control system is configured to:
automatically update the version information for the first copy of the object to indicate the indirect conflict when a commit operation is performed on the second branch.

17. The version control system of claim 16:
wherein the first object includes a first object function specified as computer source code;
wherein the third object includes a separate third object function that is called by the first object function; and
wherein the separate third object function is required in order for the first object function to execute properly.

18. The version control system of claim 1, wherein the version control system is configured to:
determine modified files of a child branch that are unmodified in a parent branch; and
determine modified files of the parent branch that are unmodified in the child branch.

19. The version control system of claim 18, wherein the version control system is configured to:
determine records of a first copy of a database that have changed in the child branch; and
determine records in a second copy of the database that have changed in a parent branch.

20. The version control system of claim 19, wherein the version control system is configured to transfer the records from the first database to replace the corresponding records in the second database.

* * * * *